United States Patent
Odate et al.

(10) Patent No.: US 10,949,610 B2
(45) Date of Patent: Mar. 16, 2021

(54) COMPUTING MACHINE AND TEMPLATE MANAGEMENT METHOD

(71) Applicant: Hitachi, Ltd., Tokyo (JP)

(72) Inventors: Ryosuke Odate, Tokyo (JP); Hiroshi Shinjo, Tokyo (JP); Yasufumi Suzuki, Tokyo (JP); Masahiro Motobayashi, Tokyo (JP)

(73) Assignee: HITACHI, LTD., Tokyo (JP)

( * ) Notice: Subject to any disclaimer, the term of this patent is extended or adjusted under 35 U.S.C. 154(b) by 107 days.

(21) Appl. No.: 16/270,621

(22) Filed: Feb. 8, 2019

(65) Prior Publication Data
US 2019/0286692 A1  Sep. 19, 2019

(30) Foreign Application Priority Data

Mar. 14, 2018 (JP) .............. JP2018-046651

(51) Int. Cl.
*G06F 40/186* (2020.01)
*G06T 7/70* (2017.01)
(Continued)

(52) U.S. Cl.
CPC .......... *G06F 40/186* (2020.01); *G06F 16/355* (2019.01); *G06F 40/103* (2020.01);
(Continued)

(58) Field of Classification Search
CPC .... G06F 40/186; G06F 40/103; G06F 16/355; G06F 16/90335; G06T 7/70;
(Continued)

(56) References Cited

U.S. PATENT DOCUMENTS 5,696,844 A * 12/1997 Takagi ................ G06K 9/48
382/199
5,857,179 A * 1/1999 Vaithyanathan ...... G06F 16/345
(Continued)

FOREIGN PATENT DOCUMENTS

JP  2001-126010 A  5/2001

OTHER PUBLICATIONS

Joshua Lande, "How to Create Tables and Insert Data into SQL Databases", publisher: joshualande.com, published: Apr. 2014, pp. 1-5.*

*Primary Examiner* — Wilson W Tsui
(74) *Attorney, Agent, or Firm* — Mattingly & Malur, PC

(57) ABSTRACT

A computing machine managing a template manages a document format, a template, and a cluster generated on the basis of a classification result based on a position of the document in a feature space in such a manner that they correspond to one another; determines whether a cluster to which a target document can belong is present on the basis of a position, in the feature space, of the target document in a case of detecting an opportunity of generating a template of the target document; registers the template of the target document in a case of determining that the cluster to which the target document can belong is not present; generates a cluster corresponding to the registered template; and manages a document format of the target document, the registered template, and the generated cluster in such a manner that they correspond to one another.

8 Claims, 24 Drawing Sheets

(51) Int. Cl.
*G06K 9/00* (2006.01)
*G06F 40/103* (2020.01)
*G06F 16/35* (2019.01)

(52) U.S. Cl.
CPC ............ *G06K 9/00442* (2013.01); *G06T 7/70* (2017.01); *G06K 2209/01* (2013.01); *G06T 2207/10008* (2013.01); *G06T 2207/30176* (2013.01)

(58) Field of Classification Search
CPC ........... G06T 2207/10008; G06T 2207/30176; G06K 9/00442; G06K 9/00449; G06K 9/4676; G06K 9/6272; G06K 2209/01
See application file for complete search history.

(56) References Cited

U.S. PATENT DOCUMENTS

| | | | |
|---|---|---|---|
| 6,751,614 B1* | 6/2004 | Rao | G06F 16/355 |
| 8,724,907 B1* | 5/2014 | Sampson | G06K 9/00483 382/218 |
| 9,158,833 B2* | 10/2015 | Urbschat | G06K 9/00469 |
| 2004/0102958 A1* | 5/2004 | Anderson, IV | G06F 40/186 704/4 |
| 2005/0076295 A1* | 4/2005 | Simske | G06K 9/00442 715/243 |
| 2007/0196021 A1* | 8/2007 | Nicholson | G06K 9/34 382/229 |
| 2011/0271177 A1* | 11/2011 | Bastos dos Santos | G06F 40/174 715/256 |
| 2013/0205199 A1* | 8/2013 | Damera-Venkata | G06F 40/106 715/243 |
| 2014/0029857 A1* | 1/2014 | Kompalli | G06K 9/00483 382/212 |
| 2014/0280167 A1* | 9/2014 | Ghessassi | G06K 9/00483 707/738 |
| 2015/0161468 A1* | 6/2015 | Higa | G06K 9/6211 382/199 |
| 2017/0220545 A1* | 8/2017 | Gururajan | G06F 3/0482 |
| 2017/0330049 A1* | 11/2017 | Kalyuzhny | G06K 9/00449 |
| 2018/0144042 A1* | 5/2018 | Sheng | G06F 16/93 |

* cited by examiner

FIG.3

| DOCUMENT NUMBER 301 | DOCUMENT FORMAT 302 | ATTRIBUTE NAME 303 | POSITION INFORMATION 304 | CLUSTER NUMBER 305 |
|---|---|---|---|---|
| 1 | TYPE A | AMOUNT CLAIMED | (X11,X12) | 1 |
| | | BANK NAME | (X21,X22) | |
| | | BANK BRANCH NAME | (X31,X32) | |
| | | BANK ACCOUNT TYPE | (X41,X42) | |
| | | BANK ACCOUNT NUMBER | (X51,X52) | |
| 2 | TYPE B | AMOUNT CLAIMED | (X61,X62) | 8 |
| | | BANK NAME | (X71,X72) | |
| | | BANK BRANCH NAME | (X81,X82) | |
| | | BANK ACCOUNT TYPE | (X91,X92) | |
| | | BANK ACCOUNT NUMBER | (X101,X102) | |
| ⋮ | ⋮ | ⋮ | ⋮ | ⋮ |

READ RESULT MANAGEMENT INFORMATION 221

FIG.4

TEMPLATE INFORMATION 222

| 401 | 402 | 403 | 404 | 405 | 406 | 407 |
|---|---|---|---|---|---|---|
| TEMPLATE NUMBER | ATTRIBUTE NAME | POSITION INFORMATION | CLAIMANT NAME | DOCUMENT FORMAT | GENERATION SOURCE DOCUMENT NUMBER | USE FREQUENCY |
| 1 | AMOUNT CLAIMED | (X11,X12) | (X11,X12) | TYPE A | 1 | 150 |
|   | BANK NAME | (X21,X22) |   |   |   |   |
|   | BANK BRANCH NAME | (X31,X32) |   |   |   |   |
|   | BANK ACCOUNT TYPE | (X41,X42) |   |   |   |   |
|   | BANK ACCOUNT NUMBER | (X51,X52) |   |   |   |   |
| 2 | AMOUNT CLAIMED | (X61,X62) | (X61,X62) | TYPE B | 6 | 47 |
|   | BANK NAME | (X71,X72) |   |   |   |   |
|   | BANK BRANCH NAME | (X81,X82) |   |   |   |   |
|   | BANK ACCOUNT TYPE | (X91,X92) |   |   |   |   |
|   | BANK ACCOUNT NUMBER | (X101,X102) |   |   |   |   |
| ... | ... | ... | ... | ... | ... | ... |

FIG.5

| | | CLUSTER MANAGEMENT INFORMATION 223 | | |
|---|---|---|---|---|
| 501 | 502 | 503 | 504 | 505 |
| CLUSTER NUMBER | THRESHOLD | POSITION ERROR | COORDINATES CHANGE | CENTER OF GRAVITY |
| 1 | 100 | NOT PRESENT | NOT PRESENT | (A1,B1) |
| 2 | 0 | PRESENT | NOT PRESENT | (A2,B2) |
| 3 | 350 | NOT PRESENT | NOT PRESENT | (A3,B3) |
| 4 | 10 | NOT PRESENT | AMOUNT CLAIMED: (X11, Y11)~(X12, Y12) | (A4,B4) |
| ⋮ | ⋮ | ⋮ | ⋮ | ⋮ |

FIG.6

| ATTRIBUTE NAME | CHARACTER STRING |
|---|---|
| BANK NAME | XXX BANK<br>xxx BANK<br>AA BANK<br>aa BANK<br>... |
| BRANCH NAME | YYY BRANCH<br>yyy BRANCH<br>BB BRANCH<br>bb BRANCH<br>BRANCH ... |
| ACCOUNT TYPE | ORDINARY<br>CURRENT<br>OR-DI-NARY<br>CU-RRENT<br>ORDINARY DEPOSIT<br>CURRENT DEPOSIT<br>(ORDINARY)<br>(CURRENT) |

WORD DICTIONARY 224 — 601 ATTRIBUTE NAME, 602 CHARACTER STRING

FIG.7

| ATTRIBUTE NAME | NOTATION |
|---|---|
| ACCOUNT NUMBER | N<br>NN<br>NNN<br>NNNN<br>NNNNN<br>NNNNNN<br>NNNNNNN |
| AMOUNT | ¥NN,NNN<br>NN,NNN YEN<br>... |
| DATE | NN.NN.NN<br>YEAR NN/MONTH NN/DATE NN |

NOTATION DICTIONARY 225
701 — ATTRIBUTE NAME
702 — NOTATION

FIG.9

READ ELEMENT 900

| | ATTRIBUTE NAME | AMOUNT CLAIMED |
|---|---|---|
| 901 | ITEM VALUE | "10,000 YEN" |
| 902 | POSITION | (x11,x12); (x21,x22); |
| 903 | | |
| 904 SCORE | OCR SCORE | 80 |
| | POSITION SCORE | 26 |

FIG.18

TEMPLATE REGISTRATION SCREEN — 1800

1810
| DOCUMENT ID |
|---|
| 1 |
| 3 |
| 4 |
| 8 |
| 10 |

SELECT — 1820

1830
| ATTRIBUTE |
|---|
| AMOUNT CLAIMED |
| BANK NAME |
| BANK BRANCH NAME |
| BANK ACCOUNT TYPE |
| BANK ACCOUNT NUMBER |

ADD — 1840

1850
BILL
JUNE 29, 2017
MESSRS. A CORPORATION   B SHOP
AMOUNT 1,234 YEN
PLEASE TRANSFER THE ABOVE AMOUNT INTO THE FOLLOWING ACCOUNT. ACCOUNT TO BE TRANSFERRED INTO
XX BANK   YY BRANCH
ORDINARY   1234567

REGISTER — 1860

FIG.19

TEMPLATE REGISTRATION SCREEN 1900

1910

MESSRS. [A CORPORATION] [B SHOP]　JUNE 29, 2017　[BILL]

AMOUNT [1,234 YEN]

PLEASE TRANSFER THE ABOVE AMOUNT INTO THE FOLLOWING ACCOUNT.
ACCOUNT TO BE TRANSFERRED INTO
[XX BANK] [YY BRANCH]
[ORDINARY] [1234567]

1920

MESSRS. [A CORPORATION] [B SHOP]　JUNE 29, 2017　[BILL]

AMOUNT [1,234 YEN]

PLEASE TRANSFER THE ABOVE AMOUNT INTO THE FOLLOWING ACCOUNT.
ACCOUNT TO BE TRANSFERRED INTO
[XX BANK] [YY BRANCH] [ORDINARY] [1234567]

[CHANGE] 1930

[REGISTER] 1940　[ABANDON] 1950

COMPUTING MACHINE AND TEMPLATE MANAGEMENT METHOD

CLAIM OF PRIORITY

The present application claims priority from Japanese patent application JP 2018-046651 filed on Mar. 14, 2018, the content of which is hereby incorporated by reference into this application.

FIELD OF THE INVENTION

1. Field of the Invention

The present invention relates to a computing machine that generates a template used in work processes using a document and a template management method.

2. Description of the Related Art

An opportunity of using electronic applications has increased with the development of digitalization. In the electronic applications, documents and the like subjected to the applications are not all digitalized but images generated by scanning paper based documents or paper are often used.

In the present specification, a computerized document is referred to as "electronically based document" and an image generated by scanning a paper based document or paper is also referred to as "paper based document." Furthermore, in the case in which the electronically based document and the paper based document are not distinguished, each of the former and latter documents is often simply referred to as "document."

For example, in accounting work in a company, the following procedures are executed: (1) an applicant receives a bill from a claimant, (2) the applicant submits the bill in which the payment of an amount claimed to the claimant is described to a treasury department by an electronic application, and (3) in the case in which a person belonging to the treasury department checks attributes described in the bill and determines that the electronic application is proper, the company pays the amount claimed to the claimant.

The attribute means herein a character string to be examined and indicating a feature of a document. For example, in the case of the accounting work, a name and a designation of a claimant, a billing content, an amount claimed, a billing date, a due date for payment, a bank account number of a bank account to be transferred into, and the like are applicable to the attributes.

An electronic application that handles a paper based document requires a person to check the paper based document, resulting in low work efficiency. To address the problem, there is known a method of automating work by reading attributes from a document using an optical character recognition (OCR) technique and checking the attributes.

In the case of reading the attributes from the document by an OCR process, a template that defines types of attributes in the document to be examined and positions at which the attributes are described is used. Generally, it is necessary to prepare the template before execution of the OCR process, so that improvement in efficiency of template generation is a challenge to be addressed. To address this challenge, a technique described in Japanese Patent Application No. H11-310599 (JP-2001-126010-A) is known.

Japanese Patent Application No. H11-310599 (JP-2001-126010-A) describes "a business form processor including: means for inputting a master image of a business form; means for designating regions such as a character preprinted guide line on the master image; means for extracting ruled line features in a peripheral part of each of the designated regions from the master image; and means for arranging region information and the ruled line feature about at least each of the regions in order in accordance with a preset ruled line definition format, and outputting the region information and the ruled line features as ruled line definition data."

Using the technique described in Japanese Patent Application No. H11-310599 (JP-2001-126010-A) makes it possible to reduce the number of processes of generating templates used in the OCR process; thus, it is possible to improve work efficiency and reduce a cost required for the work.

According to the technique described in Japanese Patent Application No. H11-310599 (JP-2001-126010-A), it is necessary to input the master image in advance. Therefore, the technique is used on the premise that types and patterns of the positions of the attributes of the document to be examined, that is, a format of the document to be examined is known.

Therefore, in the case in which the format of the document to be examined is unknown or in which the format of the document changes over time, the technique described in Japanese Patent Application No. H11-310599 (JP-2001-126010-A) is inapplicable. In the case in which an unknown document format is input during use of an apparatus that performs a document examination on condition described above, a user needs to manually generate a template.

However, in the case in which it is determined that the document format is unknown because of an error or the like in a position of reading any of the attributes by the OCR process, a new template is generated although it is unnecessary to generate the template. This results in generation of waste of a cost required for generating the unnecessary template.

SUMMARY OF THE INVENTION

The present invention provides a system and a method for generating and managing a necessary template.

A typical example of the invention disclosed in the present application is as follows. In other words, a computing machine according to the invention is a computing machine managing a template that defines a position, on a document, of at least one attribute contained in the document, in which the computing machine includes a template management module that manages the template, and in which the template management module: manages a document format, the template, and a cluster generated on the basis of a classification result based on a position of the document in a feature space, in such a manner that the document format, the template, and the cluster correspond to one another, the feature space being a space with a feature of the document calculated using the template assumed as an axis; determines whether a cluster to which a target document on which a recognition process has been executed can belong is present on the basis of a position, in the feature space, of the target document in a case of detecting an opportunity of generating a template of the target document; registers the template of the target document in a case of determining that the cluster to which the target document can belong is not present; generates a cluster corresponding to the registered template; and manages a document format of the target document, the registered template, and the generated cluster in such a manner that the document format, the registered template, and the generated cluster correspond to one another.

According to one aspect of the present invention, a computing machine can manage templates to avoid generating an unnecessary template. Objects, configurations, and effects other than those described above will be readily apparent from the description of an embodiment given below.

BRIEF DESCRIPTION OF THE DRAWINGS

FIG. 3 depicts an example of a data structure of read result management information according to the first embodiment;

FIG. 4 depicts an example of a data structure of template information according to the first embodiment;

FIG. 5 depicts an example of a data structure of cluster management information according to the first embodiment;

FIG. 6 depicts an example of a data structure of a word dictionary according to the first embodiment;

FIG. 7 depicts an example of a data structure of a notation dictionary according to the first embodiment;

FIG. 9 depicts an example of a data structure of a read element generated by the computing machine according to the first embodiment;

FIG. 18 depicts an example of a template registration screen displayed by the computing machine according to the first embodiment;

FIG. 19 depicts an example of a template comparison screen displayed by the computing machine according to the first embodiment.

DESCRIPTION OF THE PREFERRED EMBODIMENTS

Figure 1:
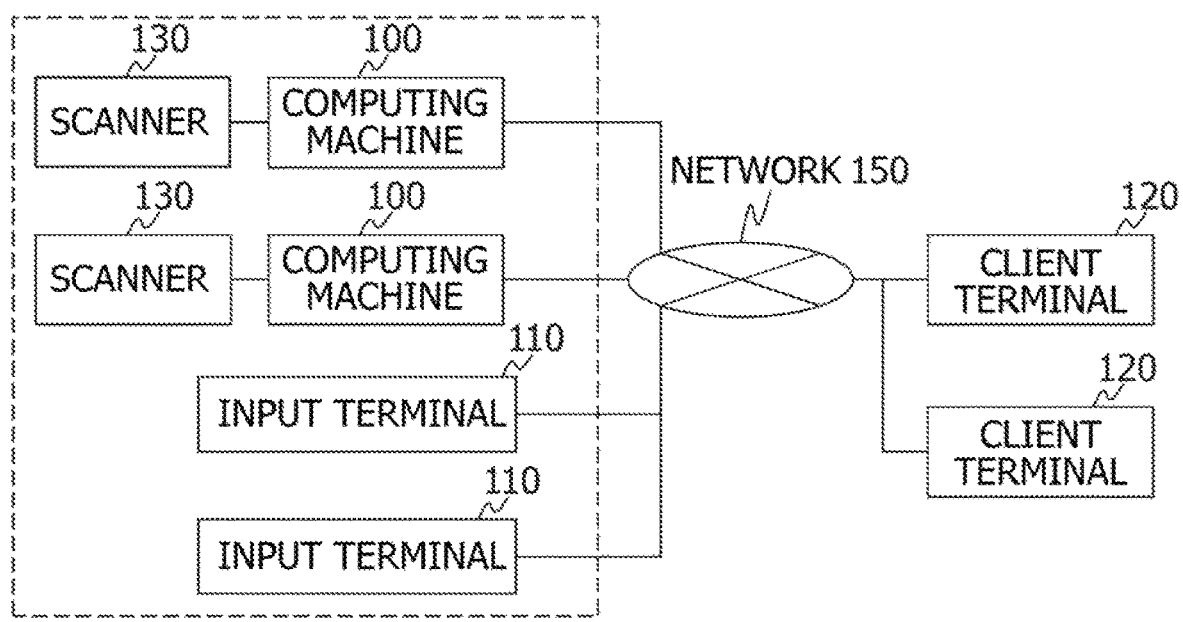
FIG. 1 depicts an example of a configuration of a system according to a first embodiment.

An embodiment of the present invention will be described hereinafter with reference to the drawings.

In the drawings for describing the embodiment, parts having the same functions are denoted by the same reference characters and repetition of description thereof will be omitted. It is noted that the embodiment described hereinafter does not limit the invention set forth in claims. Furthermore, elements described in the embodiment and combinations of the elements are not necessarily essential to the object of the invention.

Moreover, in the following description, an expression such as "xxx table" is often used as an example of information; however, the information may have any data structure. In other words, to indicate that information does not depend on a data structure, "xxx table" can be rephrased as "xxx information." Further, in the following description, a configuration of each table is an example and one table may be divided into two or more tables and all of or part of the two or more tables may be integrated into one table.

FIG. 1 depicts an example of a configuration of a system according to a first embodiment.

The system is configured with computing machines 100, input terminals 110, client terminals 120, and scanners 130. The computing machines 100, the input terminals 110, and the client terminals 120 are mutually connected via a network 150. In addition, the scanners 130 are connected to the computing machines 100 either directly or via the network 150.

It is noted that a type of the network 150 is not limited to a specific one in the present invention. Possible examples of the network 150 include a LAN (Local Area Network) and a WAN (Wide Area Network). Furthermore, a connection scheme of the network 150 is not limited to a specific one in the present invention and may be either wireless connection or wired connection. Moreover, the scanners 130 may be connected to the computing machine 100 and the client terminals 120 either directly or via the network 150.

It is noted that the numbers of the computing machines 100, the input terminals 110, the client terminals 120, and the scanners 130 included in the system according to the present invention can be arbitrarily set.

Each of the computing machines 100 executes processes related to an electronic application. Furthermore, the computing machine 100 manages templates used in the electronic application. Details of the processes executed by the computing machine 100 will be described with reference to FIGS. 10 to 16.

Each of the client terminals 120 is a terminal operated by a user (applicant) filing the electronic application. The user operates the client terminal 120, inputs information necessary for the electronic application, and submits a paper document associated with the electronic application. Possible examples of the submitted paper document include a certificate that shows that the electronic application is legitimate.

In submitting the paper document, the user may submit the paper document directly to a company or an administrative facility in charge of the electronic application. In a case in which the scanner 130 is connected to the client terminal 120, the user may use the scanner 130 to generate document image data 801 (refer to FIG. 8) from the paper document and submit the document image data 801. It is noted that a type of the electronic application and a type of the document to be handled are not limited to specific ones in the present invention. Possible examples of the type of the document include various documents such as a bill, a statement of delivery, a receipt, a withholding exemption certificate, and a tax notice and various certificates such as a driver's license and an individual number.

A document input at a time of the electronic application contains a plurality of attributes that are character strings used in an examination of the electronic application. For example, in a case in which the document is a bill, the attributes include character strings such as an amount claimed, a claimant name, a bill-to name, a date of issue, and a bank name, a branch name, an account type, and an account number for designating an account to be transferred into, and further include a seal affixed by the claimant.

In the first embodiment, the attributes are managed in such a manner that a type of each attribute (designation of each attribute) corresponds to an object acquired as the attribute. Furthermore, the object is a concept that includes not only a character string but also symbols such as an arrow, a rectangle, and a circle.

Each of the input terminals 110 is a terminal operated by an examiner managing the computing machine 100 or examining the electronic application. Each of the scanners 130 generates the document image data 801 from the paper document. Possible examples of the scanner 130 include a flatbed scanner and a cut-sheet feeder scanner.

It is noted that the system may be configured with a digital camera that captures an image using such a device as a CCD (Charge Coupled Device) as an alternative to the scanner 130.

In the first embodiment, each computing machine 100 executes at least any one of an OCR process and an image recognition process using the scanner 130. In a case in which the OCR process and the image recognition process are not distinguished, each of the processes will be referred as "recognition process" in the following description.

Figure 2:
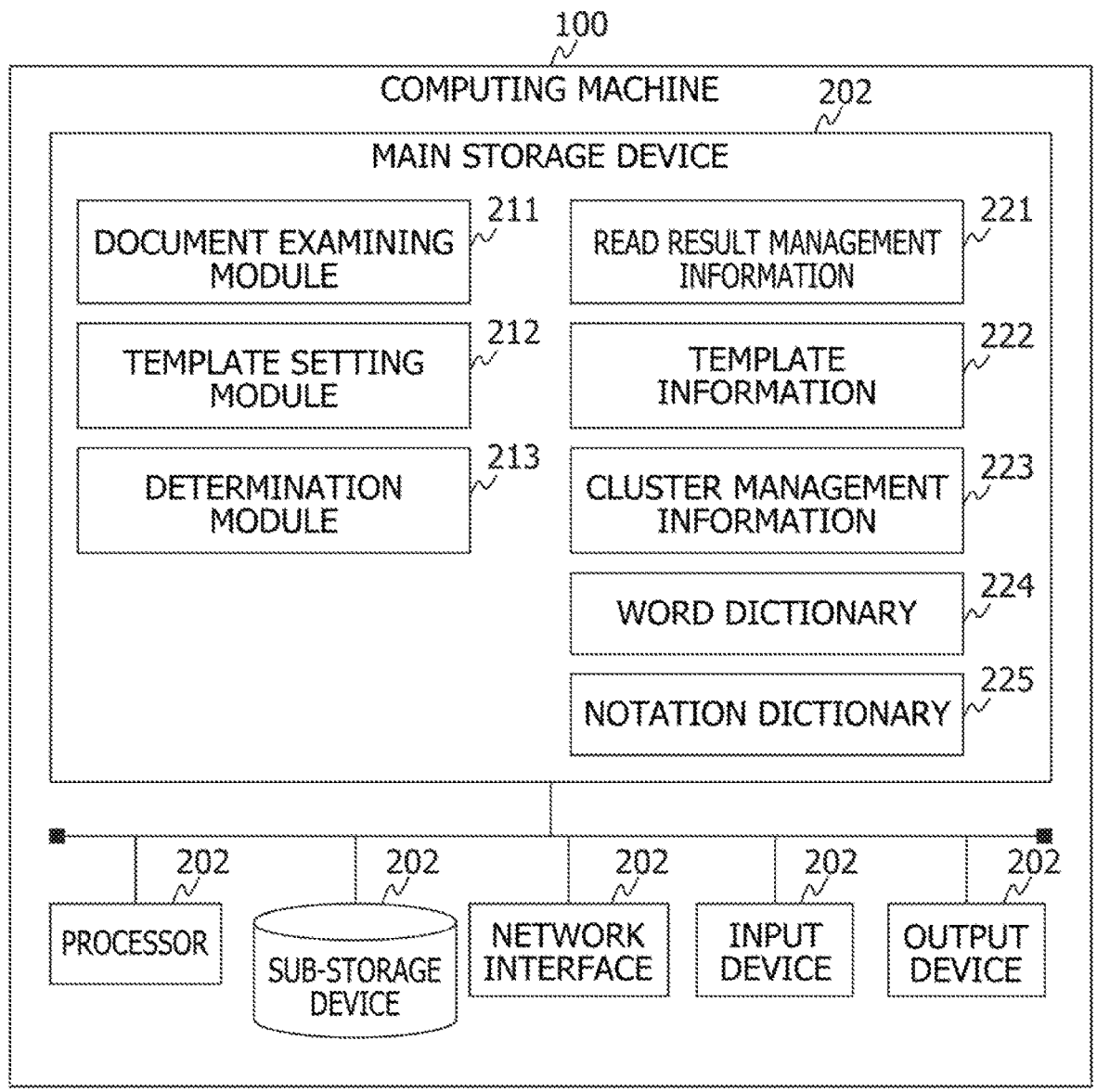
FIG. 2 is an explanatory diagram of a hardware configuration and a software configuration of a computing machine according to the first embodiment.

FIG. 2 is an explanatory diagram of a hardware configuration and a software configuration of the computing machine 100 according to the first embodiment.

The computing machine 100 has a processor 201, a main storage device 202, a sub-storage device 203, a network interface 204, an input device 205, and an output device 206. The hardware is mutually connected via an internal bus or the like. While the number of hardware is one in FIG. 2, the number may be two or more.

It is noted that hardware configurations of the input terminal 110 and the client terminal 120 are the same as that of the computing machine 100.

The processor 201 executes programs stored in the main storage device 202. Executing a process in accordance with any of the programs enables the processor 201 to operate as a module that realizes a specific function. Describing a process with a module set as a subject hereinafter indicates that the processor 201 executes a program that realizes the module.

The main storage device 202 stores the programs executed by the processor 201 and information used by the programs. In addition, the main storage device 202 includes a work area temporarily used by each program. Possible examples of the main storage device 202 include a memory.

The main storage device 202 according to the first embodiment stores programs that realize a document examination module 211, a template setting module 212, and a determination module 213. In addition, the main storage device 202 stores read result management information 221, template information 222, cluster management information 223, a word dictionary 224, and a notation dictionary 225. Although not depicted in FIG. 2, the main storage device 202 also stores image data regarding an input document.

The main storage device 202 does not necessarily store the programs that realize all the modules and the information.

The document examination module 211 executes an electronic application examination process. Specifically, the document examination module 211 accepts an electronic application, and generates document summary information on the basis of a template and attributes acquired by the recognition process on the document. The document examination module 211 examines the electronic application using the document summary information. Details of the process executed by the document examination module 211 will be described later with reference to FIG. 11.

The document summary information is information that is a summary of the attributes acquired from the document. In a case of the document corresponding to a bill, the document summary information contains the attributes (character strings) corresponding to an amount claimed, and a bank name, a branch name, an account type, and an account number for identifying an account to be transferred into, and the attributes (character strings) corresponding to a claimant name, a claimee, and the like. In a case of the document corresponding to a receipt, the document summary information contains the attributes (character strings) corresponding to an amount of money, a designation of a person or an organization that purchased an article or received a service, a person or an organization that sold the article or offered the service, and the like.

In a manual examination process on the electronic application, the examiner generates the document summary information and operates the input terminal 110 to input the document summary information to the computing machine 100. In an automated examination process on the electronic application, the document examination module 211 generates the document summary information as an alternative to the examiner.

It is noted that the examination process on the electronic application may be performed by a plurality of examiners or the document examination module 211 may perform the process as an alternative to part of the examiners.

The template setting module 212 generates and changes templates. The template setting module 212 manages each template using the template information 222.

The determination module 213 determines whether to generate a template corresponding to a document format of an arbitrary target document. In the first embodiment, the determination module 213 classifies the document on the basis of a document format and a position (coordinates) of the document in a feature space, and determines whether to generate a template on the basis of a result of the classification.

It is noted that as for each module realized by the computing machine 100, a plurality of modules may be integrated into one module or one module may be divided into a plurality of modules according to functions. For example, the template setting module 212 and the determination module 213 may be realized as a template management module.

The read result management information 221 is information for managing a read result acquired from the document by the recognition process using the scanner 130. Information indicating a position of an attribute on a page space for each attribute type is stored in the read result management information 221 according to the first embodiment. Details of the read result management information 221 will be described with reference to FIG. 3.

The template information 222 is information for managing the templates each defining positions of character strings or images used in the examination and acquired from each document. Details of the template information 222 will be described with reference to FIG. 4.

The cluster management information 223 is information for managing clusters (sets) of documents in the feature space. The feature space according to the first embodiment is a space with a feature calculated from a recognition result of each document using the template assumed as an axis. Details of the cluster management information 223 will be described with reference to FIG. 5.

The word dictionary 224 and the notation dictionary 225 are information defining the character strings acquired as the attributes. Details of the word dictionary 224 will be described with reference to FIG. 6 and those of the notation dictionary 225 will be described with reference to FIG. 7. It is noted that information defining figures acquired as the attributes may be stored in the main storage device 202.

The sub-storage device 203 stores data persistently. Possible examples of the sub-storage device 203 include an HDD (Hard Disk Drive) and an SSD (Solid State Drive). It is noted that the programs and the information stored in the main storage device 202 may be stored in the sub-storage device 203. In this case, the processor 201 reads the programs and the information from the sub-storage device 203 and loads the programs and the information into the main storage device 202.

The network interface 204 is an interface for connecting the computing machine 100 to other devices via the network 150.

The input device 205 is a device for inputting data to the computing machine 100. Examples of the input device 205 include a keyboard, a mouse, and a touch panel.

The output device 206 is a device that outputs a data input screen, process results, and the like. Examples of the output device 206 include a touch panel and a display.

FIG. 3 depicts an example of a data structure of the read result management information 221 according to the first embodiment.

The read result management information 221 contains entries each configured with a document number 301, a document format 302, attribute names 303, position information 304, and a cluster number 305. One entry corresponds to a read result of the document to be examined. In addition, one entry contains one or more rows of attributes used in the examination of the document.

The document number 301 is a field that stores identification information for uniquely identifying each document. In the first embodiment, the identification information about the document is also used as identification information about each entry.

The document format 302 is a field that stores information indicating a format of the document to be examined such as a bill, a receipt, or an order form.

Each of the attribute names 303 is a field that stores an identification designation representing a type of each attribute contained in the document. In the first embodiment, the number of rows of the attribute names 303 contained in one entry is five; however, the number of rows is not limited to five. The number of types of attributes to be handled may be changed depending on the document and the process.

The position information 304 is a field that stores information about a position of each attribute acquired from the document by the recognition process. For example, upper left and lower right coordinates of a rectangular region are stored in the position information 304. It is noted that the coordinates may be relative coordinates representing relative position relationships among the attributes or absolute coordinates indicating an absolute position on the page space.

The cluster number 305 is a field that stores identification information about a cluster to which the document belongs.

FIG. 4 depicts an example of a data structure of the template information 222 according to the first embodiment.

The template information 222 contains entries each configured with a template number 401, attribute names 402, position information 403, a claimant name 404, a document format 405, a generation source document number 406, and a use frequency 407. One entry corresponds to one template. In addition, one entry contains one or more rows of attributes defined in the template. It is noted that the document format 405 is the same field as the document format 302.

The template number 401 is a field that stores identification information for uniquely identifying each template. In the first embodiment, the identification information about the template is also used as identification information about each entry.

Each of the attribute names 402 is a field that stores identification names representing a type of each attribute contained in the template.

The position information 403 is a field that stores information about positions of the attributes in one region configuring a document. More specifically, information about a position of each attribute on a page space corresponding to one page is stored in the position information 403. For example, upper left and lower right coordinates of a rectangular region are stored in the position information 403. It is noted that the coordinates may be relative coordinates representing relative position relationships among the attributes or absolute coordinates indicating an absolute position on the page space. Furthermore, information designating a plurality of positions may be stored in the position information 403.

It is noted that the information stored in the position information 403 is not limited to specific one in the present invention. For example, each entry may contain fields that store a length of each attribute and a range in which the attribute is described.

The claimant name 404 is a field that stores information indicating a user, a company, or the like to which the template is applied.

In the first embodiment, a template corresponding to an entry in which a document format matches the document format 405 and a claimant designation matches the claimant name 404 is applied.

It is noted that each entry may contain a field that stores an applicant name as information for selecting an applicable template and may contain a field that stores a combination of a claimant and an applicant besides the claimant name 404. It is noted that in a case in which a template can be selected on the basis of only the document format, the entry does not need to contain the claimant name 404 field.

The generation source document number 406 is a field that stores identification information about a document used in a case of generating the template. For example, a value set in the generation source document number 406 corresponds to a value in the document number 301 in the read result management information 221. It is noted that the generation source document number 406 may be a field that stores information which is other than the document number and which can identify the document.

The use frequency 407 is a field that stores a use frequency of the template corresponding to the template number 401. Dates of use may be stored in the use frequency 407 as an alternative to the use frequency. In this case, the number of dates of use corresponds to the use frequency.

While the template information 222 depicted in FIG. 4 is information in a table format with the template number 401 used as the identification information about each entry, the template information 222 may be information in a table format with a combination of the claimant name 404 and the document format 405 used as the identification information about the entry.

FIG. 5 depicts an example of a data structure of the cluster management information 223 according to the first embodiment.

The cluster management information 223 contains entries each configured with a cluster number 501, a threshold 502, a position error 503, a coordinates change 504, and a center of gravity 505. One entry corresponds to one cluster.

Each cluster according to the first embodiment is generated by a classification process based on a document format and a position of the document in the feature space as will be described later.

The cluster number 501 is a field that stores identification information for uniquely identifying each cluster. In the first embodiment, the identification information about the cluster is also used as identification information about each entry.

The threshold 502 is a field that stores a threshold of a scale that indicates a range of the cluster in the feature space. For example, a distance from a center of gravity of the cluster in the feature space is stored in the threshold 502. It is noted that a type of the scale is not limited to a specific one in the present invention. For example, possible examples of the scale include a Euclidean distance, a variance, and a standard deviation.

The position error 503 is a field that stores information as to whether the cluster is configured with a document having an attribute acquired from an incorrect position on the page space. The position error 503 is used as a parameter that represents a type of the cluster. Therefore, a document having attributes which are all acquired from correct positions on the page space and a document having at least one of the attributes which is acquired from an incorrect position on the page space are managed as those belonging to different clusters even if the document format is the same.

In the first embodiment, either "present" or "not present" is stored in the position error 503. "Present" indicates that the cluster is configured with a document having at least one of the attributes which is acquired from an incorrect position on the page space, and "not present" indicates that the cluster is configured with a document having the attributes which are all acquired from correct positions on the page space. It is noted that the number of attributes acquired from incorrect positions on the page space may be stored in the position error 503.

In the present specification, a cluster configured with a document without errors in attribute acquisition positions on the page space will be referred to as "correct cluster" and a cluster configured with a document with an error in attribute acquisition positions on the page space will be referred to as "incorrect cluster."

The coordinates change 504 is a field that stores information indicating whether the cluster is a cluster including a document having an attribute at a variable position on the page space depending on the document.

In a case of the cluster that does not include a document having an attribute at a variable position on the page space depending on the document, "not present" is stored in the coordinates change 504. In a case of the cluster that includes a document having an attribute at a variable position on the page space depending on the document, "present" is stored in the coordinates change 504.

The center of gravity 505 is a field that stores coordinates of the center of gravity of the cluster in the feature space. It is noted that each entry may contain fields that store information about the feature space and information indicating features of a cluster in the feature space as well as the center of gravity 505.

At least one cluster corresponds to one document format as indicated by the read result management information 221, and at least one template corresponds to one document format as indicated by the template information 222. Therefore, the computing machine 100 can manage each document format, each template, and each cluster on the basis of the read result management information 221, the template information 222, and the cluster management information 223 in such a manner that the document format, the template, and the cluster correspond to one another.

FIG. 6 depicts an example of a data structure of the word dictionary 224 according to the first embodiment.

The word dictionary 224 is information that defines words (character strings) acquired as attributes, and contains entries each configured with an attribute name 601 and a character string 602. One entry corresponds to one attribute.

The attribute name 601 is a field that stores an identification designation of each attribute. The character string 602 is a field that stores words (character strings) classified into the attribute name 601.

FIG. 7 depicts an example of a data structure of the notation dictionary 225 according to the first embodiment.

The notation dictionary 225 is information that defines character strings corresponding to numeric values (character strings) acquired as attributes, and contains entries each configured with an attribute name 701 and a notation 702. One entry corresponds to one attribute.

The attribute name 701 is a field that stores an identification designation of each attribute. The notation 702 is a field that stores notation rules of numeric values (character strings) classified into the attribute name 701.

Figure 8:
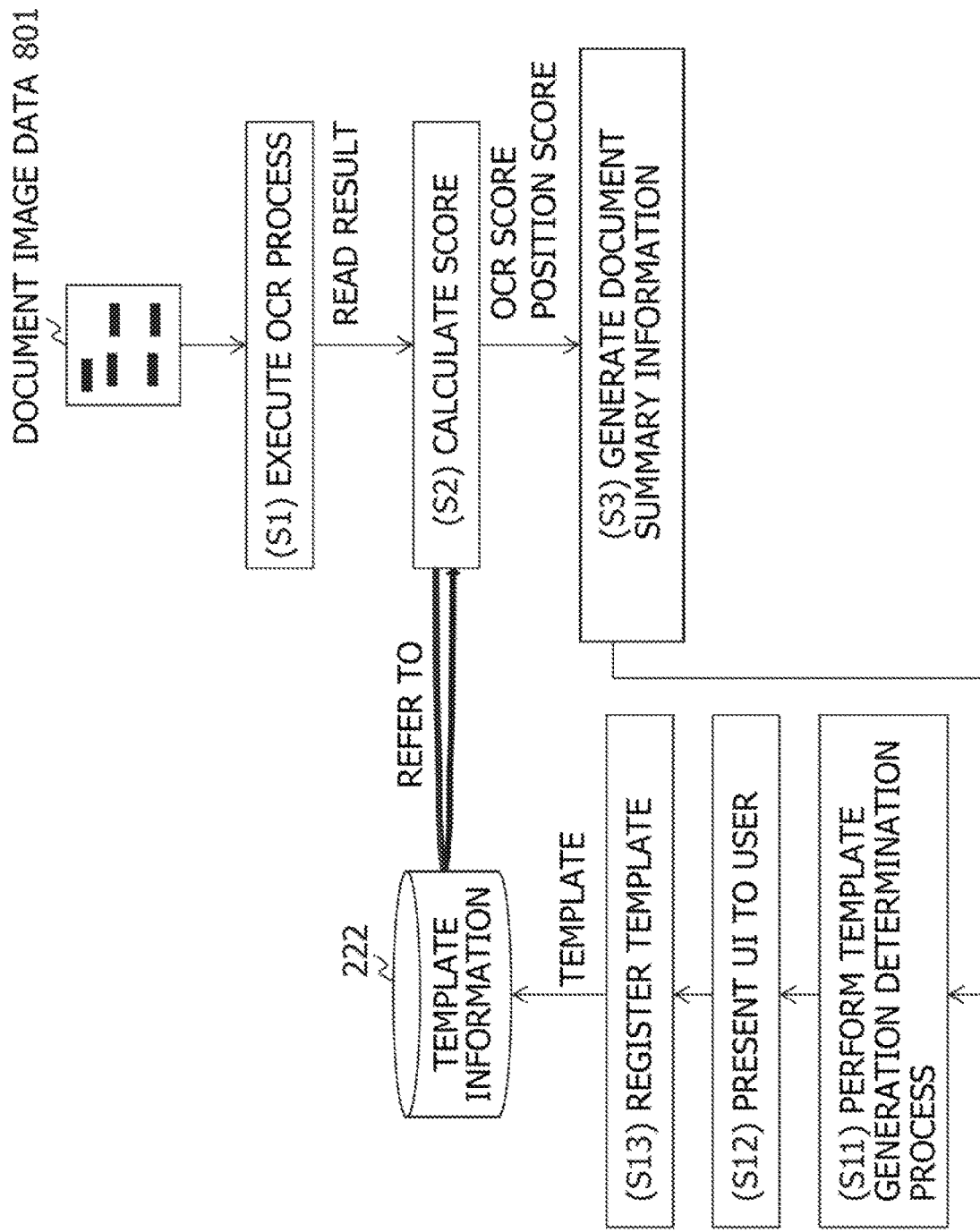
FIG. 8 depicts an outline of processes executed by the computing machine according to the first embodiment.

FIG. 8 depicts an outline of processes executed by the computing machine 100 according to the first embodiment. FIG. 9 depicts an example of a data structure of a read element 900 generated by the computing machine 100 according to the first embodiment.

The computing machine 100 executes a document examination process and a template management process. It is noted that execution timing of the document examination process may be either synchronous with or asynchronous to that of the template management process. The two processes may be executed sequentially. Furthermore, the two processes may be executed as independent processes.

Processes from Steps S1 to S3 indicate the document examination process and those from Steps S11 to S13 indicate the template management process.

In Step S1, the document examination module 211 executes a recognition process on the document image data 801 and generates a read result in a case of inputting the document image data 801 to the computing machine 100. It is assumed herein that the document examination module 211 executes the OCR process as the recognition process.

In Step S2, the document examination module 211 calculates a score related to each attribute included in each template using the read result and the template, and generates the read element 900 in which the attribute is made to correspond to the score. At this time, the document examination module 211 refers to the template information 222 as needed. In the first embodiment, at least one score is calculated for one attribute. Furthermore, one or more read elements 900 are generated for one template.

As depicted in FIG. 9, the read element 900 is configured with an attribute name 901, an item value 902, a position 903, and a score 904.

The attribute name 901 is a field that stores the identification designation of each attribute. The item value 902 is a field that stores an attribute acquired by the OCR process. The position 903 stores the position of the attribute acquired by the OCR process on the page space. The score 904 is a field group that stores a score associated with the OCR process, a score associated with the attribute using the template, and the like.

The computing machine 100 according to the first embodiment calculates an OCR score and a position score. The OCR score is a score that evaluates a result of the OCR process. For example, the OCR score is a value or the like that represents a degree of matching between an acquired character string and registered letter forms. The OCR score, if being a higher value, indicates a lower probability of reading an incorrect attribute. The position score is a value that represents a degree of a deviation between the position of the attribute acquired from the document image data 801 on the page space and the position of the attribute in the template. The position score, if being a lower value, indicates a smaller position deviation.

It is noted that the calculated scores are not limited to the scores described above. Examples of the scores may include an area score related to the rectangular region including the attribute, an item score associated with a distance between attributes equal in attribute type, and an appearance frequency score related to an appearance frequency of the attribute.

In Step S3, the document examination module 211 selects a template suited for generating document summary information on the basis of the one or more read elements 900 of each template, and generates the document summary information on the basis of the one or more read elements of the selected template. It is noted that possible examples of a template selection method include a method of selecting a template having a highest total value of the position scores of the one or more read elements 900 of each template.

In Step S11, the determination module 213 executes a template generation determination process. In a case of determining to generate a template, the determination module 213 goes to Step S12.

In Step S12, the template setting module 212 presents an interface for generating a template to an operator. The operator generates a template using the interface and transmits an instruction to the template setting module 212 to register the generated template.

In Step S13, the template setting module 212 registers information about a new template in the template information 222 in a case of receiving the template registration instruction.

According to a conventional technique, in a case of inputting a document having the attribute acquired by the recognition process and located at the position, on the page space, which differs from the position defined in the template, the computing machine 100 determines that the format of the document is unknown and generates a new template. However, with the conventional determination method, the computing machine 100 also generates a template in a case of reading the attribute from the incorrect position. Owing to this, the same template as the existing template is generated, which results in waste of a template management cost.

To avoid the above problem, the determination module 213 determines whether to generate a template by executing the template generation determination process in the first embodiment. This can cut the waste of the management cost.

Figure 10:
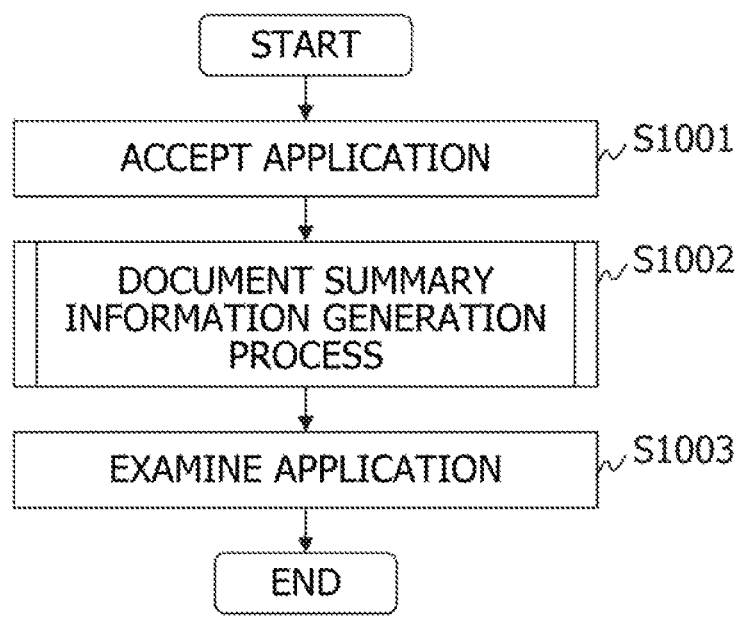
FIG. 10 is a flowchart describing a document examination process executed by the computing machine according to the first embodiment.

FIG. 10 is a flowchart describing the document examination process executed by the computing machine 100 according to the first embodiment.

The document examination module 211 accepts a request of an electronic application from the client terminal 120 operated by the user (Step S1001). The request of the electronic application contains the document image data 801 to be examined.

It is noted that in a case in which the document image data 801 is stored in an external storage device, the user may contain identification information about the document image data 801 in the request of the electronic application. Furthermore, the user may submit a paper document. In a case of user's submitting the paper document, the computing machine 100 scans the paper document using the scanner 130 and generates the document image data 801.

Next, the document examination module 211 executes a document summary information generation process (Step S1002). The document summary information is generated in the document summary information generation process. Details of the document summary information generation process will be described later with reference to FIG. 11.

The computing machine 100 examines the electronic application using the document summary information (Step S1003). The computing machine 100 outputs a response of either "permission2 or "rejection" to the user as an examination result.

Figure 11:
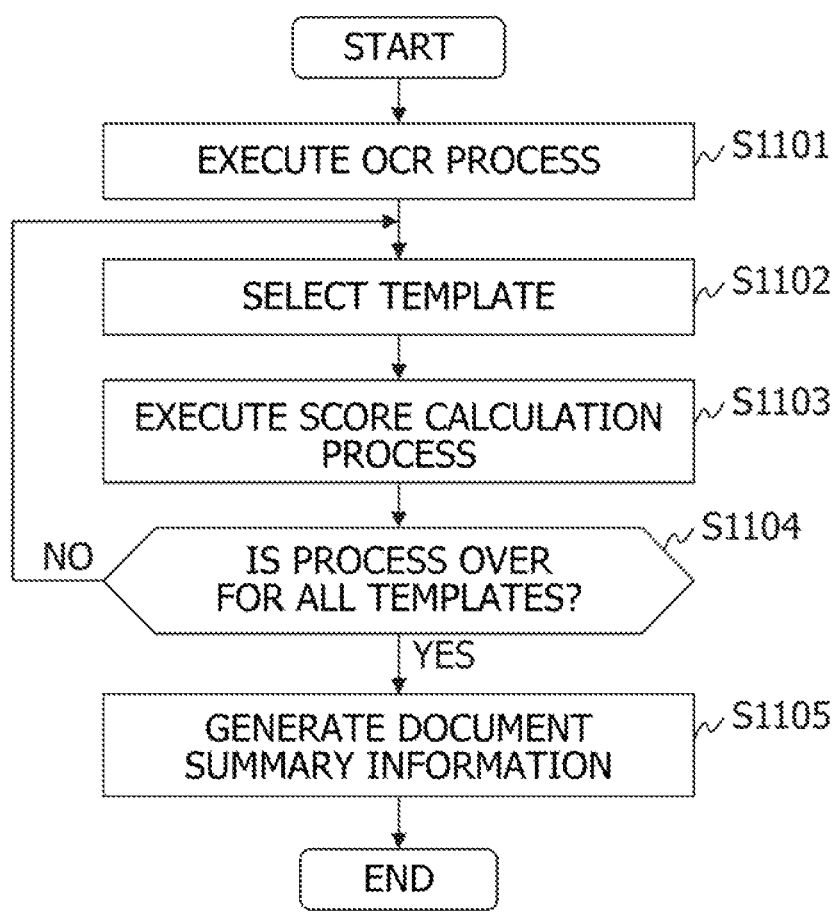
FIG. 11 is a flowchart describing a document summary information generation process executed by a document examination module according to the first embodiment.

FIG. 11 is a flowchart describing the document summary information generation process executed by the document examination module 211 according to the first embodiment.

The document examination module 211 starts the document summary information generation process described hereinafter in a case in which the document image data 801 is input.

First, the document examination module 211 executes an OCR process on the document image data 801 (Step S1101). Since the document examination module 211 may use a well-known method to perform the OCR process, detailed description the OCR process will be omitted. The document examination module 211 can acquire data regarding a character string group (read result) to be handled in processes from the document image data 801 by the OCR process. The document examination module 211 registers the read result in the read result management information 221. It is noted that a value set to the document format 302 may be input by the user or the operator or may be determined on the basis of a result of analysis on the character strings acquired by the OCR process.

Next, the document examination module 211 selects one template from the template information 222 (Step S1102). For example, the document examination module 211 selects the template from the entries from the top in the template information 222.

Next, the document examination module 211 executes a score calculation process (Step S1103). In the score calculation process, the document examination module 211 outputs a score of the read element 900 for each type of the attributes contained in the selected template. An example of a method of generating the read element 900 and a score calculation method will now be described.

The document examination module 211 selects a target attribute type from among the types of the attributes contained in the selected template. In other words, the document examination module 211 selects one attribute name 402 contained in the entry corresponding to the selected template.

The document examination module 211 refers to the word dictionary 224 and searches attributes (character strings) matching or similar to the character strings 602 in the entry corresponding to the target attribute type from the read result. At this time, the document examination module 211 searches not only the character strings that are the same as the character strings 602 but also attributes (character strings) that match or are similar to the character strings 602 in meaning or the like using a synonym dictionary that is not depicted. Furthermore, the document examination module 211 refers to the notation dictionary 225 and searches attributes (character strings) in notations matching or similar to the notations 702 in the entry corresponding to the target attribute type from the read result.

The document examination module 211 generates a free read element 900 and sets the target attribute type to the attribute name 901. The document examination module 211 sets each of the searched attributes to the item value 902 and sets the position of the searched attribute on the page space to the position 903. At this timing, one read element 900 is generated for one searched attribute.

The document examination module 211 calculates a distance between the searched character strings on the basis of the positions 903 in the read elements 900, and integrates the read elements 900 of the character strings for which the distance between the character strings is equal to or smaller than a threshold into one read element 900. In this case, a plurality of values are set to the item value 902 and the position 903 in the read element 900 obtained by integration.

In a case in which an attribute is not acquired even with use of any of the word dictionary 224 and the notation dictionary 225, the document examination module 211 sets the target attribute type to the attribute name 901, sets the item value 902 and the position 903 to blank fields, and sets "0" to all the values in the score 904.

The document examination module 211 refers to the word dictionary 224 and the item value 902, compares one of the character strings 602 in the entry corresponding to the target attribute type with each attribute acquired using the word dictionary 224, and calculates a score on the basis of a comparison result. Furthermore, the document examination module 211 refers to the notation dictionary 225 and the item value 902, compares one of the notations 702 in the entry corresponding to the target attribute type with the attribute acquired using the notation dictionary 225, and calculates a score on the basis of a comparison result. For example, the document examination module 211 calculates a degree of matching between at least one of the notations 702 and the attribute as a score. The document examination module 211 sets a total value of the two scores to the OCR score.

The document examination module 211 calculates an error in the position of the attribute using the position 903 and the position information 403 in the row corresponding to the target attribute type, and calculates a position score on the basis of the error. For example, the document examination module 211 calculates the position score using an equation having the error set as a parameter.

The document examination module 211 similarly executes the process on all the attribute types contained in the selected template. The document summary information generation process will now be described again.

Next, the document examination module 211 determines whether the process is over for all the templates (Step S1104).

In a case of determining that the process is not over for all the templates, the document examination module 211 returns to Step S1102 and similarly executes the process.

In a case of determining that the process is over for all the templates, the document examination module 211 generates document summary information (Step S1105). The document examination module 211 then ends the document summary information generation process.

Specifically, the document examination module 211 selects the read element 900 of each of the attribute types contained in each template. The document examination module 211 calculates a comparison value that is a value for evaluating attribute acquisition accuracy by the recognition process. The document examination module 211 selects a template used to generate the document summary information on the basis of the comparison value of each template, and generates the document summary information from the read elements 900 corresponding to the selected template. At this time, the document examination module 211 refers to the template information 222 and increments a value of the use frequency 407 in the entry corresponding to the selected template by "1."

Figure 12:
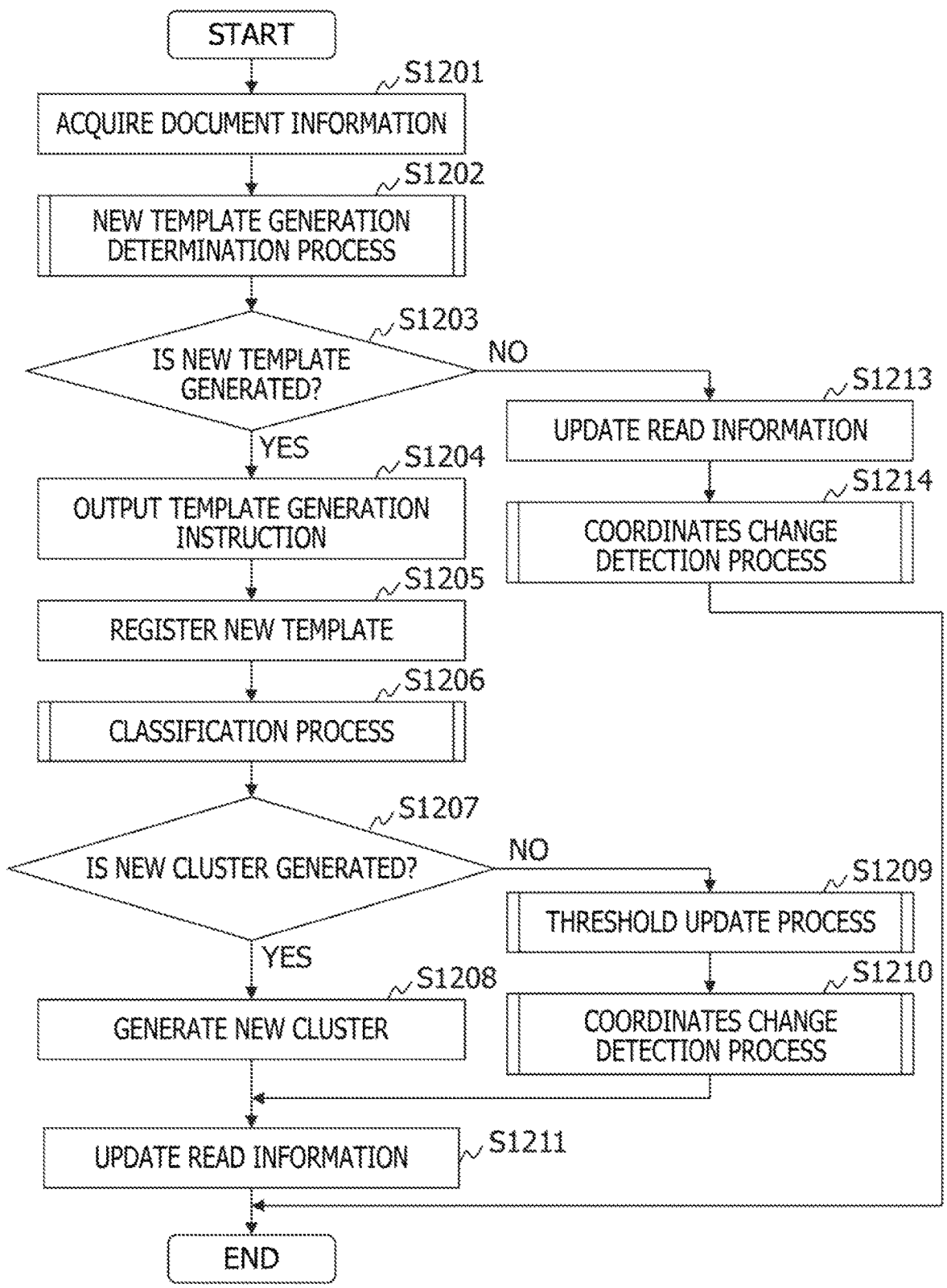
FIG. 12 is a flowchart describing a template management process executed by the computing machine according to the first embodiment.

FIG. 12 is a flowchart describing a template management process executed by the computing machine 100 according to the first embodiment. The computing machine 100 executes a process described below in a case of detecting an opportunity of executing the process on the target document. For example, the computing machine 100 detects completion of the document examination process, reception of an execution request from the operator, or passage of a fixed period as the opportunity of executing the process on the target document.

The determination module 213 acquires information about the target document (Step S1201). Specifically, the determination module 213 acquires identification information about the target document and the document image data 801.

Next, the determination module 213 executes the template generation determination process (Step S1202). Details of the template generation determination process will be described with reference to FIG. 13.

The determination module 213 determines whether to generate a new template for the target document on the basis of a process result of the template generation determination process (Step S1203). Specifically, the following process is executed.

The determination module 213 determines whether a generation flag output as the process result of the template generation determination process is "ON" or "OFF." In a case in which the generation flag is "ON," the determination module 213 determines to generate a new template for the target document. In a case in which the generation flag is "OFF," the determination module 213 determines not to generate a new template for the target document.

In a case of determining to generate a new template for the target document, the determination module 213 outputs a template generation instruction to the template setting module 212 (Step S1204). In a case of receiving the generation instruction, the template setting module 212 outputs information for displaying a template registration screen 1800 (refer to FIG. 18). The template setting module 212 transitions into a standby state until receiving a new template registration request from the operator.

In a case of receiving the new template registration request, the template setting module 212 registers information about the new template in the template information 222 (Step S1205). The template setting module 212 then invokes the determination module 213. Specifically, the following process is executed.

The template setting module 212 adds an entry to the template information 222 and sets identification information to the template number 401 in the added entry. The template setting module 212 sets values to the claimant name 404 and the document format 405 in the added entry on the basis of information contained in the registration request. The template setting module 212 sets the identification information about the target document to the generation source document number 406 in the added entry.

The template setting module 212 generates rows by as much as the number of attributes in the added entry on the basis of the information contained in the registration request, and sets values to the attribute name 303 and the position information 304 in each of the generated rows. These are description of the process in Step S1205.

Next, the determination module 213 executes a classification process for classifying the target document (Step S1206). Details of the classification process will be described with reference to FIG. 14.

At this time, the determination module 213 outputs a generation flag indicating whether to generate a new cluster as a process result. In a case in which the generation flag is "ON," the determination module 213 determines to generate a new cluster. In a case in which the generation flag is "OFF," the template setting module 212 determines not to generate a new cluster of the target document.

Next, the determination module 213 determines whether to generate a new cluster (Step S1207). Specifically, the determination module 213 determines whether the generation flag is "ON" or "OFF."

In a case of determining to generate a new cluster, the determination module 213 generates a new cluster and sets information about the new cluster to the cluster management information 223 (Step S1208). Specifically, the following process is executed.

The determination module 213 adds an entry to the cluster management information 223 and sets identification information to the cluster number 501 in the added entry. The determination module 213 sets "0" to the threshold 502 in the added entry and sets "not present" to the coordinates change 504.

Furthermore, the determination module 213 sets a value to the position error 503 on the basis of a result of the classification process. Specifically, in a case in which the cluster is a correct cluster, "not present" is set to the position error 503. In a case in which the cluster is an incorrect cluster, "present" is set to the position error 503. These are description of the process in Step S1208.

Next, the determination module 213 updates the read result management information 221 (Step S1211) and ends the template management process.

Specifically, the determination module 213 refers to the read result management information 221 and searches an entry in which the identification information about the target document is set to the document number 301. The determination module 213 sets the identification information about the new cluster to the cluster number 305 in the searched entry.

In a case of determining not to generate a new cluster in Step S1207, the determination module 213 executes a threshold update process (Step S1209) and also executes a coordinates change detection process (Step S1210). Details of the threshold update process will be described with reference to FIG. 15, and those of the coordinates change detection process will be described with reference to FIG. 16.

Next, the determination module 213 updates the read result management information 221 (Step S1211) and ends the template management process.

Specifically, the determination module 213 refers to the read result management information 221 and searches an entry in which the identification information about the target document is set to the document number 301. The determination module 213 sets the identification information about the cluster identified in the classification process to the cluster number 305 in the searched entry.

In a case of determining not to generate a new template of the target document in Step S1203, the determination module 213 updates the read result management information 221 (Step S1213).

Specifically, the determination module 213 refers to the read result management information 221 and searches an entry in which the identification information about the target document is set to the document number 301. The determination module 213 sets the identification information about the cluster identified in the template generation determination process to the cluster number 305 in the searched entry.

Next, the determination module 213 executes the coordinates change detection process (Step S1214). The determination module 213 then ends the template management process. The details of the coordinates change detection process will be described with reference to FIG. 16.

It is noted that the computing machine 100 may execute clustering using the read result management information 221 after detecting the opportunity of executing the process on the target document. Possible examples of the clustering include hierarchical clustering. Before execution of the clustering, the cluster number 305 is a blank field.

Figure 13:
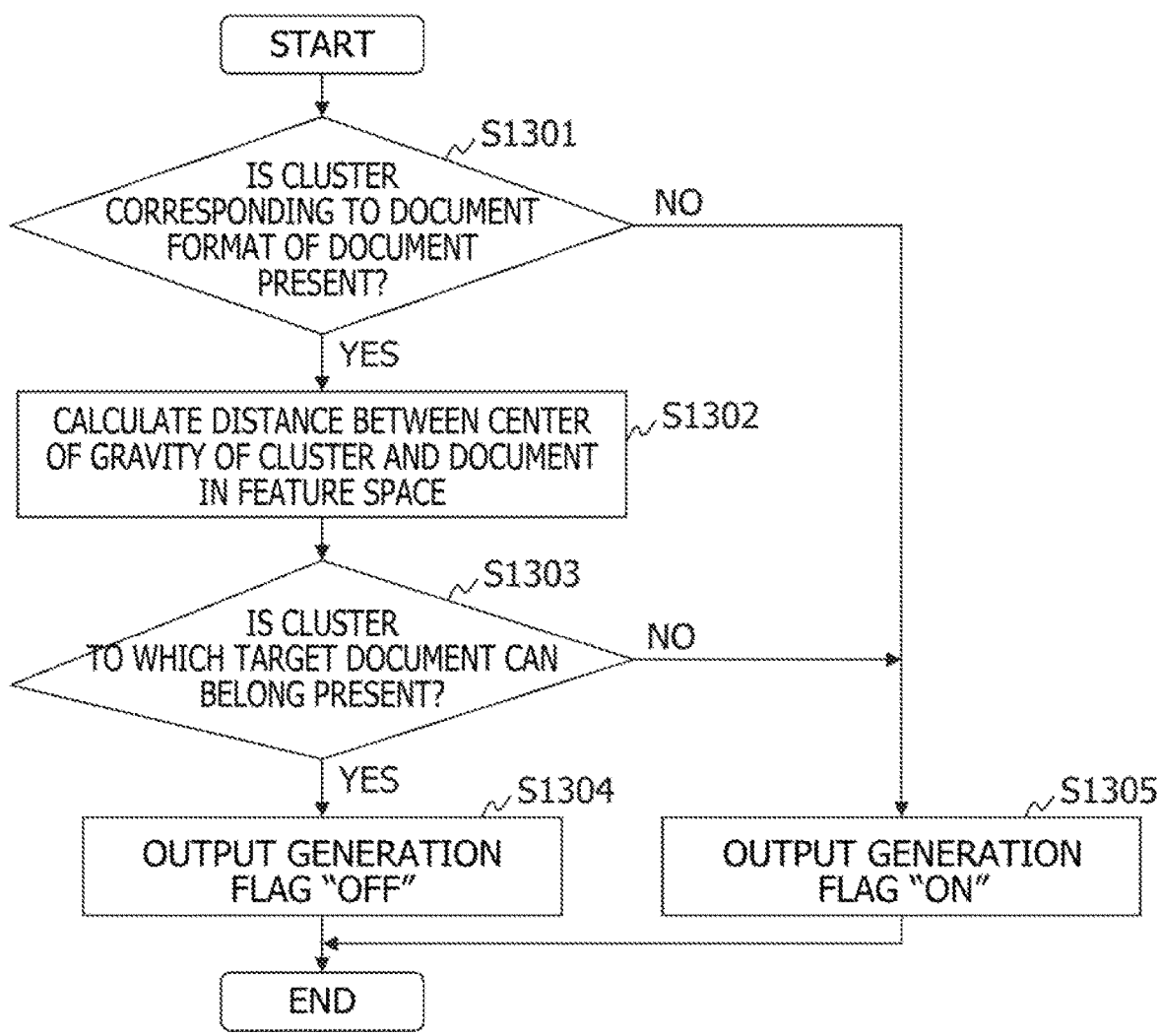
FIG. 13 is a flowchart describing a template generation determination process executed by a determination module according to the first embodiment.

FIG. 13 is a flowchart describing the template generation determination process executed by the determination module 213 according to the first embodiment.

The determination module 213 determines whether a cluster corresponding to the document format of the target document is present (Step S1301).

Specifically, the determination module 213 searches an entry in which the document format 302 matches the document format of the target document. The determination module 213 acquires the cluster number 305 in the searched entry. In a case in which such an entry is not present or in which the cluster numbers 305 in all the searched entries are blank fields, the determination module 213 determines that a cluster corresponding to the document format of the target document is not present.

In a case of determining that a cluster corresponding to the document format of the target document is not present, the determination module 213 outputs "ON" as a generation flag (Step S1305) and ends the template generation determination process.

In the first embodiment, the clusters and the templates are managed in such a manner that one cluster corresponds to one template. Owing to this, the case in which the cluster is not present represents that a corresponding template is not present. Therefore, in the case in which the cluster is not present, the determination module 213 exercises control to generate a template applied to the target document.

In a case of determining that a cluster corresponding to the document format of the target document is present, the determination module 213 calculates a distance between a position of the target document and the center of gravity of the cluster in the feature space (Step S1302). Specifically, the following process is executed.

The determination module 213 refers to the template information 222 and searches an entry in which the document format 405 matches the document format of the target document. The determination module 213 can thereby identify a template corresponding to the searched cluster. The determination module 213 executes a score calculation process using each template and selects a template used in the template generation determination process on the basis of scores. The process is the same as the process from Steps S1102 to S1104.

The determination module 213 identifies the position of the target document in the feature space on the basis of the score corresponding to the selected template. Furthermore, the determination module 213 calculates the distance between the position of the target document and the center of gravity of the searched cluster in the feature space.

In a case in which a plurality of clusters are present for one document format, the determination module 213 selects a cluster smallest in the distance. It is noted that the determination module 213 may calculate a parameter using the distance.

Next, the determination module 213 determines whether a cluster to which the target document can belong is present on the basis of the calculated distance (Step S1303).

Specifically, the determination module 213 determines whether the calculated distance is equal to or smaller than the threshold 502 of the cluster. In a case in which the calculated distance is equal to or smaller than the threshold 502 of the cluster, the determination module 213 determines that a cluster to which the target document can belong is present.

In a case in which the calculated distance is equal to or smaller than the threshold 502 of the cluster, the determination module 213 outputs "OFF" as the generation flag as well as identification information about the cluster identified in Step S1301 (Step S1304), and ends the template generation determination process.

In a case in which the calculated distance is larger than the threshold 502 of the cluster, the determination module 213 outputs "ON" as the generation flag (Step S1305), and ends the template generation determination process.

In the case in which the calculated distance is larger than the threshold 502, the determination module 213 determines that it is impossible to contain the target document in the cluster. In other words, the determination module 213 determines that it is necessary to generate a new template.

As described later, in a case of generating a template in an arbitrary document format, the computing machine 100 generates a cluster and manages the document format, the template, and the cluster in such a manner that the document format, the template, and the cluster correspond to one another. In a case in which a cluster to which an arbitrary document can belong is present, the document summary information can be generated by using the template corresponding to the cluster. This is because a read result that is the same as or similar to the document contained in the cluster is acquired for the arbitrary document. The computing machine 100 determines whether to generate a new template using the above-mentioned features.

Figure 14:
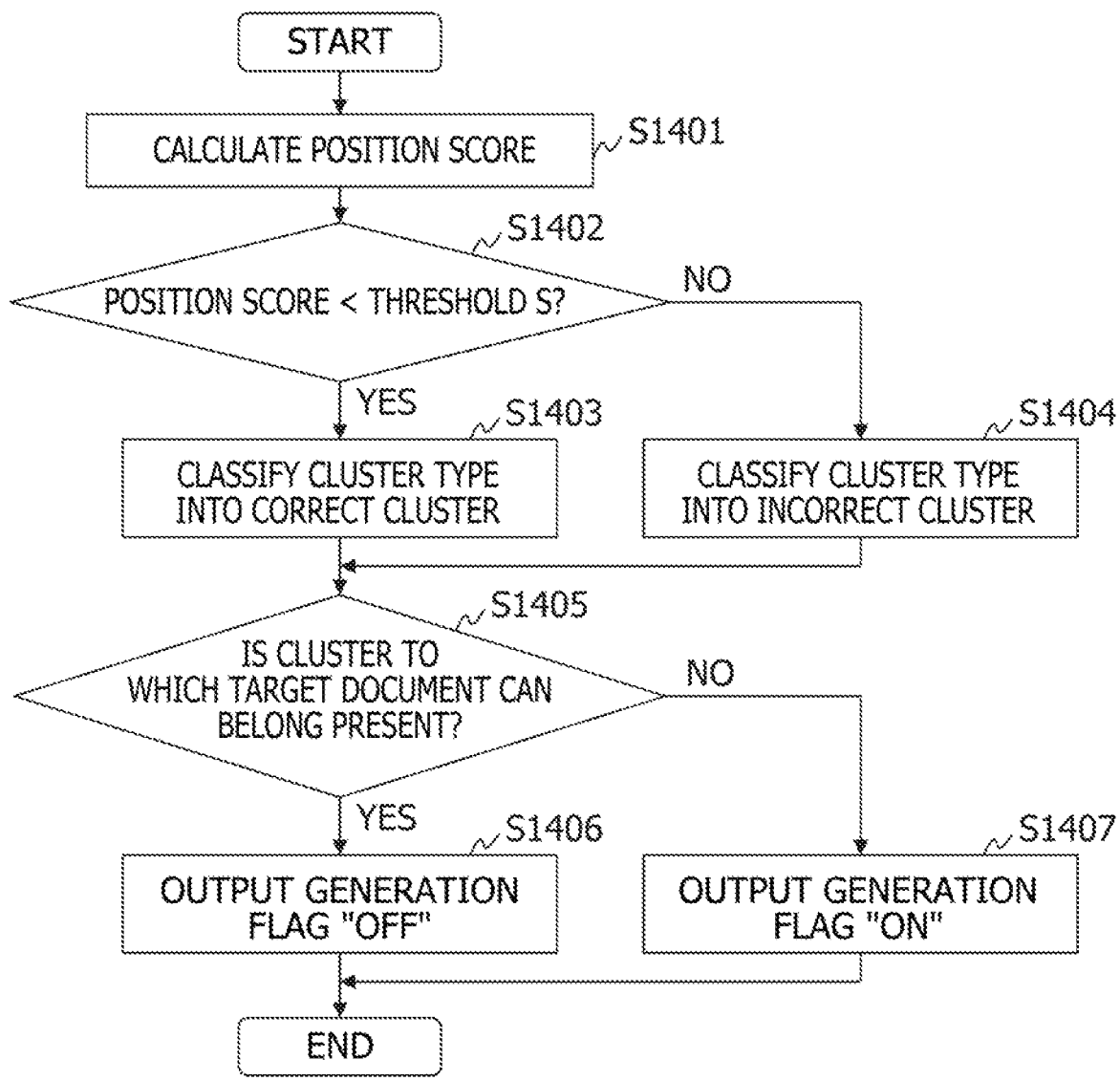
FIG. 14 is a flowchart describing a classification process executed by the determination module according to the first embodiment.

FIG. 14 is a flowchart describing the classification process executed by the determination module 213 according to the first embodiment.

The determination module 213 calculates a position score on the basis of the new template and the read result of the target document (Step S1401). A position score calculation method is the same as the method described in the score calculation process.

Next, the determination module 213 determines whether the position score is lower than a threshold S (Step S1402).

In a case in which the position score is lower than the threshold S, the determination module 213 classifies a cluster type of the target document into a correct cluster (Step S1403). The determination module 213 then goes to Step S1405.

In a case in which the position score is equal to or higher than the threshold S, the determination module 213 classifies the cluster type of the target document into an incorrect cluster (Step S1404). The determination module 213 then goes to Step S1405.

In Step S1405, the determination module 213 determines whether a cluster to which the target document can belong is present (Step S1405). Specifically, the following process is executed.

The determination module 213 refers to the cluster management information 223 and searches an entry of a cluster corresponding to the document format of the target document. A cluster search method is the same as the method used in Step S1301.

The determination module 213 compares the position error 503 in the searched entry with the position information about the target document and searches an entry in which the cluster type represented by the position error 503 matches the cluster type of the target document.

In a case in which an entry in which the cluster type represented by the position error 503 matches the cluster type of the target document is present, the determination module 213 determines the cluster corresponding to the entry as a cluster to which the target document can belong. In a case in which a plurality of entries are present, the determination module 213 selects a cluster smallest in the distance between the target document and the center of gravity in the feature space.

In a case in which an entry in which the cluster type represented by the position error 503 matches the cluster type of the target document is not present, the determination module 213 determines that a cluster to which the target document can belong is not present. These are description of the process in Step S1405.

In the case of determining that a cluster to which the target document can belong is present, the determination module 213 outputs "OFF" as the generation flag as well as identification information about the cluster (Step S1406), and ends the classification process.

In the case of determining that a cluster to which the target document can belong is not present, the determination module 213 outputs "ON" as the generation flag (Step S1407), and ends the classification process.

In the first embodiment, the correct cluster and the incorrect cluster are managed separately. Owing to this, in a case in which a cluster of the cluster type matching the cluster type of the target document even with the same document format, the determination module 213 generates a cluster other than the existing cluster.

Figure 15:
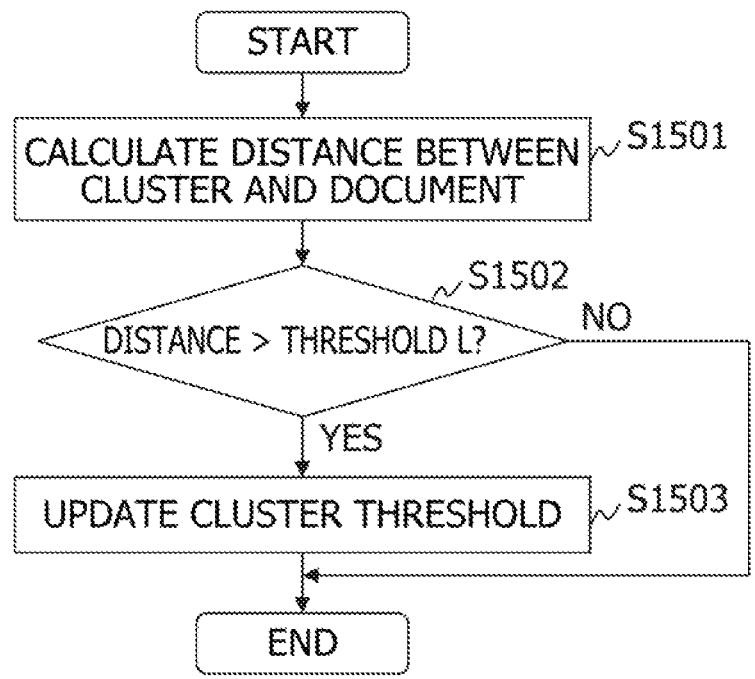
FIG. 15 is a flowchart describing a threshold update process executed by the determination module according to the first embodiment.

FIG. 15 is a flowchart describing the threshold update process executed by the determination module 213 according to the first embodiment.

The determination module 213 calculates the distance between the position of the target document and the center of gravity of the cluster to which the target document belongs in the feature space (Step S1501).

The determination module 213 determines whether the calculated distance is larger than the value of the cluster threshold 502 of the cluster to which the target document belongs (Step S1502).

In a case of determining that the calculated distance is equal to or smaller than the value of the cluster threshold 502 of the cluster to which the target document belongs, the determination module 213 ends the threshold update process. At this time, the determination module 213 calculates the center of gravity of the cluster on the basis of the position, in the feature space, of the document contained in the cluster and sets the calculated center of gravity to the center of gravity 505.

In a case of determining that the calculated distance is larger than the value of the threshold 502 of the cluster to which the target document belongs, the determination module 213 sets the calculated distance to the threshold 502 (Step S1503). The determination module 213 then ends the threshold update process. At this time, the determination module 213 calculates the center of gravity of the cluster on the basis of the position, in the feature space, of the document contained in the cluster and sets the calculated center of gravity to the center of gravity 505.

Figure 16:
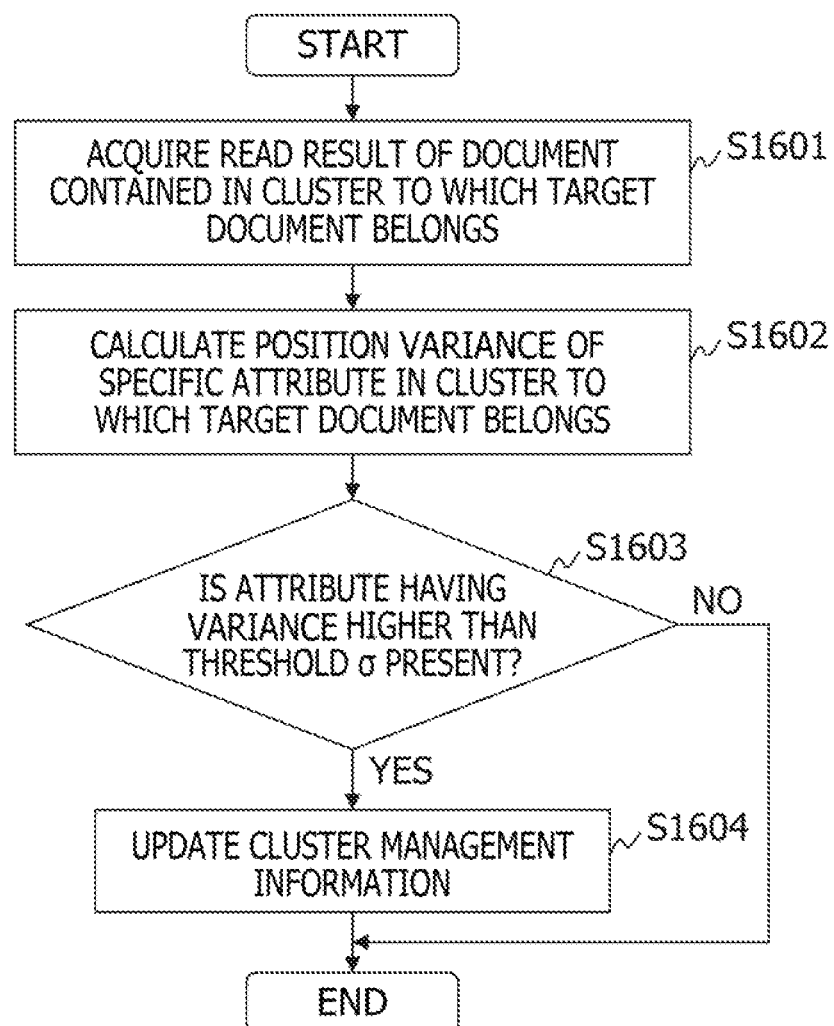
FIG. 16 is a flowchart describing a coordinates change detection process executed by the determination module according to the first embodiment.

FIG. 16 is a flowchart describing the coordinates change detection process executed by the determination module 213 according to the first embodiment.

The determination module 213 acquires the read result of the document contained in the cluster to which the target document belongs (Step S1601).

Specifically, the determination module 213 searches an entry in which the cluster number 305 matches the identification information about the cluster to which the target document belongs. The determination module 213 acquires the position information 304 about each attribute in the searched entry.

Next, the determination module 213 calculates a position variance of each attribute using the position information 304 in the entries having the same attribute name 303 as that of the acquired read result in the read result (Step S1602).

The determination module 213 determines whether the attribute having the calculated variance which is higher than a threshold σ is present (Step S1603).

In a case of determining that the attribute having the calculated variance which is higher than the threshold σ is not present, the determination module 213 ends the coordinates change detection process.

In a case of determining that the attribute having the calculated variance which is higher than the threshold σ is present, the determination module 213 updates the cluster management information 223 (Step S1604), and then ends the coordinates change detection process.

Specifically, the determination module 213 refers to the cluster management information 223 and searches an entry corresponding to the cluster to which the target document belongs. The determination module 213 sets a pair of the type of the attribute having the variance which is higher than the threshold σ and a position range of the attribute to the coordinates change 504 in the searched entry.

Specific examples of the template management process will now be described. It is assumed that no template is present in an initial state. It is also assumed that the attribute having the variance higher than the threshold σ is not present. FIGS. 17A, 17B, 17C, 17D, and 17E depict states of generating and updating a cluster (clusters) according to the first embodiment.

Figure 17A:
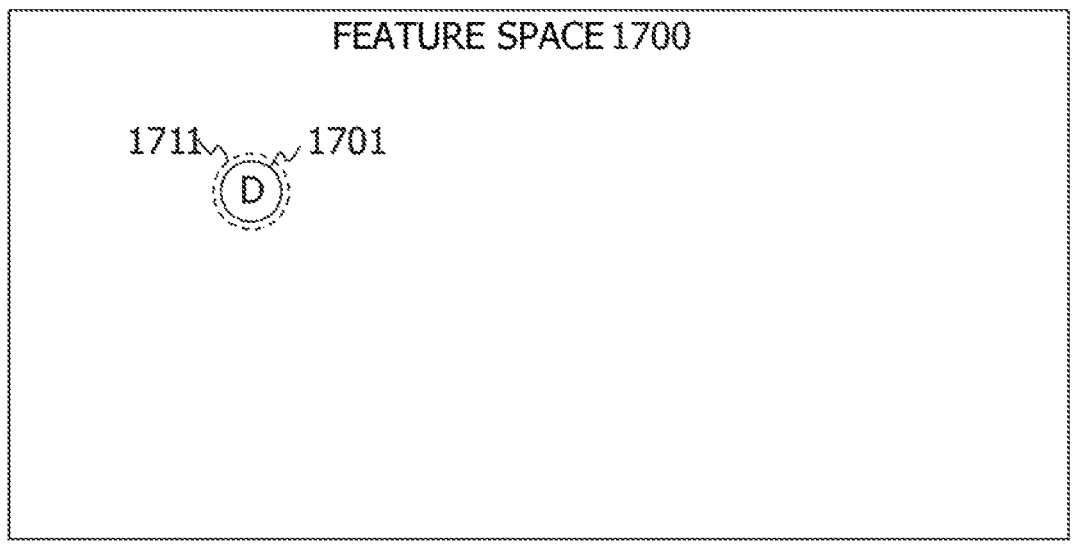
FIG. 17A depicts a state of generating and updating a cluster according to the first embodiment.

(Case 1) In a case in which a document 1701 at a position in a feature space 1700 as depicted in FIG. 17A is input as the target document, the following process is executed.

The computing machine 100 determines that a cluster is not present in Step S1301. Therefore, the computing machine 100 registers a new template in the template information 222 (Step S1205).

It is assumed that the cluster type is classified into the "correct cluster" in the classification process. In this case, a determination result of Step S1405 is NO. Therefore, the computing machine 100 generates a cluster 1711 (Step S1208) and registers information about the cluster 1711 in the cluster management information 223. Since a value of the threshold 502 of the cluster 1711 is "0," the cluster 1711 corresponds to the document 1701 itself. Owing to this, the position of the document 1701 in the feature space 1700 is set to the center of gravity 505.

Figure 17B:
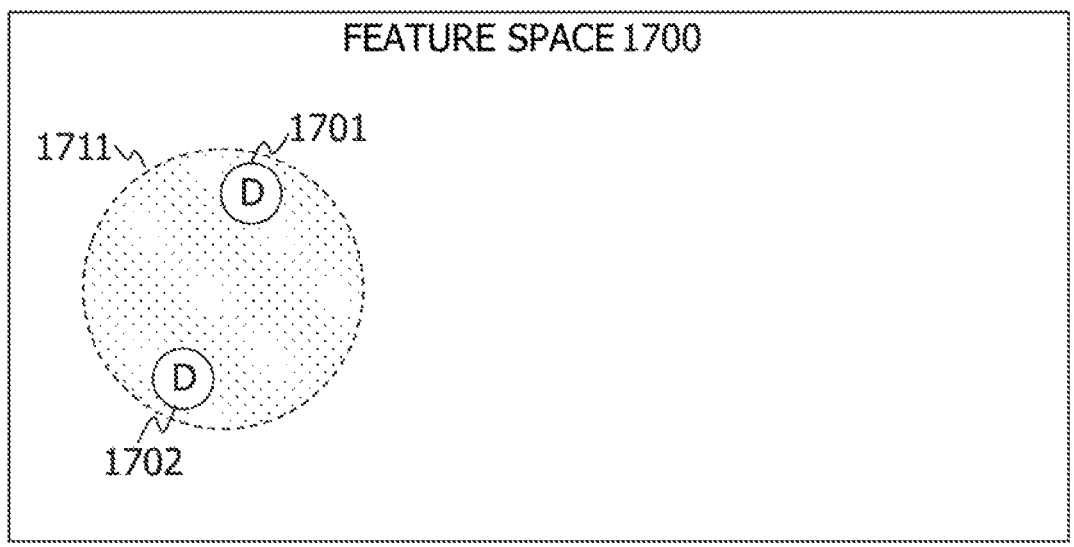
FIG. 17B depicts a state of generating and updating the cluster according to the first embodiment.

(Case 2) In a case in which a document 1702 at a position in the feature space 1700 as depicted in FIG. 17B is input as the target document, the following process is executed. It is assumed that a document format of the document 1702 is the same as the document format of the document 1701. It is also assumed that a distance between the documents 1701 and 1702 is "100" in the feature space 1700.

The computing machine 100 determines that a cluster is present in Step S1301. Since the distance between the documents 1701 and 1702 is larger than "0," a determination result of Step S1303 is NO. Therefore, the computing machine 100 registers a new template in the template information 222 (Step S1205).

It is assumed that the cluster type is classified into the "correct cluster" in the classification process. In this case, since the cluster 1711 having the same document format and the same cluster type is present, the determination result of Step S1405 is YES. In Step S1501, the computing machine 100 calculates a distance between the cluster 1711 and the document 1702. Since the distance is larger than the value "0" of the threshold 502, the computing machine 100 sets "100" to the threshold 502 in the entry in the cluster management information 223 (Step S1503). In addition, the computing machine 100 sets a center of gravity calculated from the positions of the documents 1701 and 1702 to the center of gravity 505 in the entry. The cluster 1711 is updated as depicted in FIG. 17B by the above process.

Figure 17C:
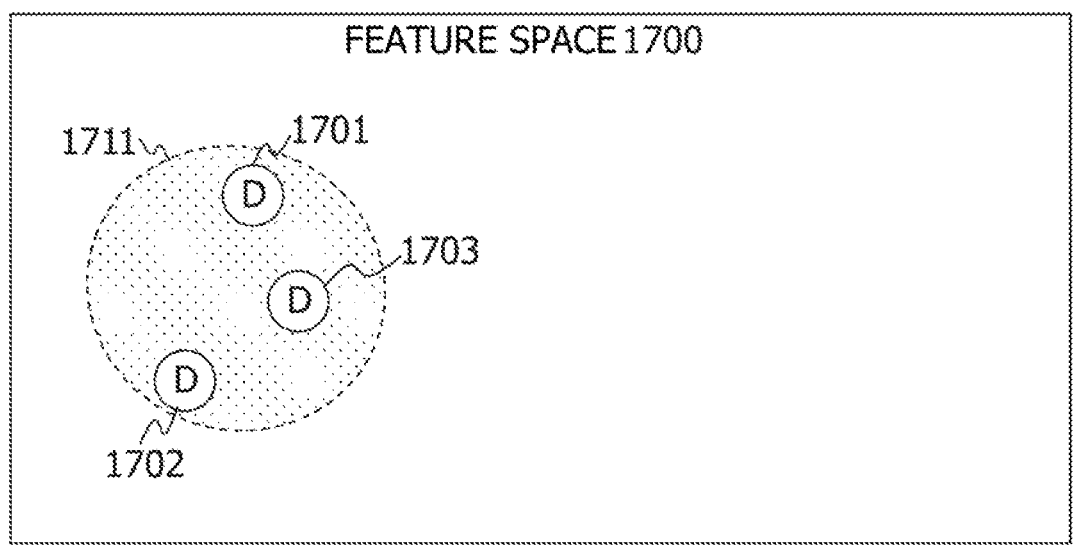
FIG. 17C depicts a state of generating and updating the cluster according to the first embodiment.

(Case 3) In a case in which a document 1703 at a position in the feature space 1700 as depicted in FIG. 17C is input as the target document, the following process is executed. It is assumed that a document format of the document 1703 is the same as the document format of the document 1701. In addition, it is assumed that a distance between the center of gravity of the cluster 1711 and the document 1703 is "60."

The computing machine 100 determines that a cluster is present in Step S1301. Since the distance between the cluster 1711 and the document 1703 is equal to or smaller than "100," the determination result of Step S1303 is YES. Therefore, a template is not generated.

It is assumed that the cluster type is classified into the "correct cluster" in the classification process. In this case, since the cluster 1711 having the same document format and the same cluster type is present, the determination result of Step S1405 is YES. In Step S1501, the computing machine 100 calculates a distance between the cluster 1711 and the document 1703. Since the distance is equal to or smaller than the value "100" of the threshold 502, the threshold of the cluster 1711 is not updated. In this case, only the center of gravity of the cluster 1711 is updated.

Figure 17D:
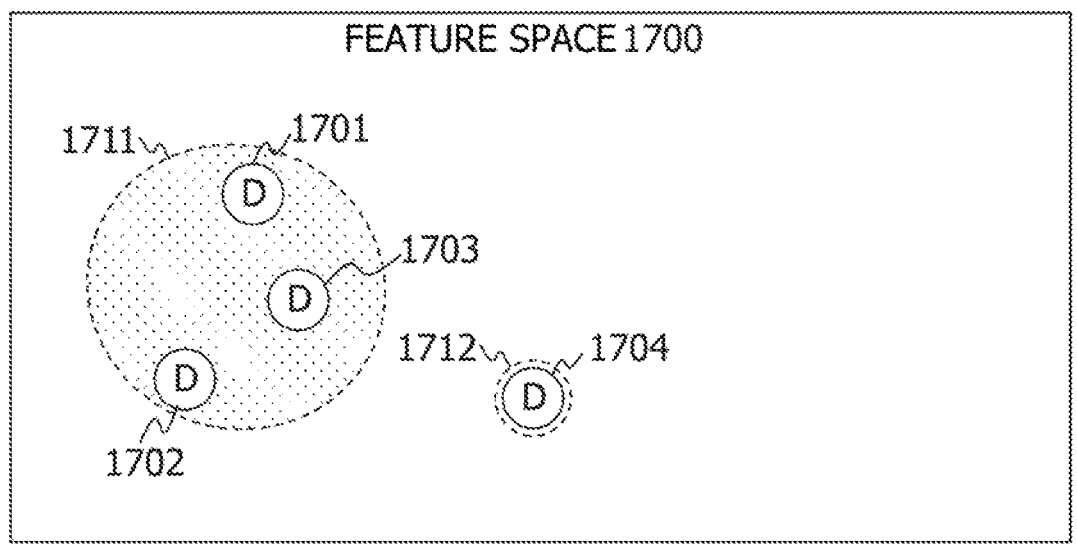
FIG. 17D depicts a state of generating and updating a cluster according to the first embodiment.

(Case 4) In a case in which a document 1704 at a position in the feature space 1700 as depicted in FIG. 17D is input as the target document, the following process is executed. It is assumed that a document format of the document 1704 is the same as the document format of the document 1701. In addition, it is assumed that a distance between the center of gravity of the cluster 1711 and the document 1704 is "150."

The computing machine 100 determines that a cluster is present in Step S1301. Since the distance between the cluster 1711 and the document 1704 is larger than "100," the determination result of Step S1303 is NO. Therefore, the computing machine 100 registers a new template in the template information 222 (Step S1205).

It is assumed that the cluster type is classified into the "incorrect cluster" in the classification process. In this case, since the cluster 1711 having the same document format and the same cluster type is not present, the determination result of Step S1405 is NO. Therefore, the computing machine 100 generates a new cluster 1712 (Step S1208).

Figure 17E:
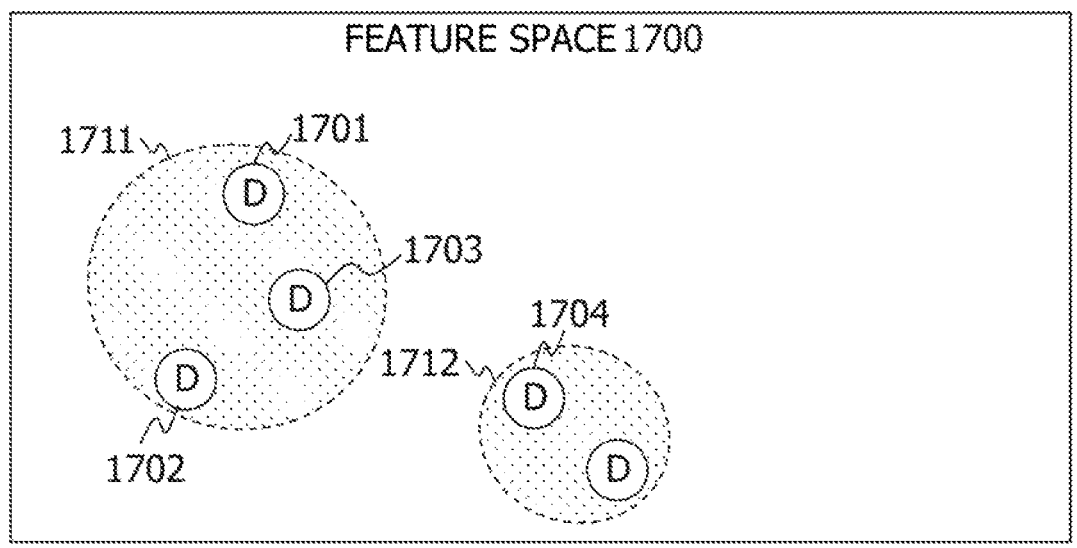
FIG. 17E depicts a state of generating and updating the clusters according to the first embodiment.

The clusters 1711 and 1712 as depicted in, for example, FIG. 17E are generated by executing a similar process hereinafter.

In the first embodiment, each cluster is labeled with the document format and the cluster type. In a case of reading an attribute from an incorrect position on the page space, the cluster type of the document is classified into the incorrect cluster. Therefore, the computing machine 100 can determine whether to generate a template in the light of an error in the recognition process. Owing to this, it is possible to cut a template management cost.

Next, examples of interfaces provided by the computing machine 100 will be described.

FIG. 18 depicts an example of the template registration screen 1800 displayed by the computing machine 100 according to the first embodiment.

The template registration screen 1800 is a screen for registering a template and is displayed along with a template generation instruction. It is noted that the template registration screen 1800 may be displayed at arbitrary timing in response to an operator's request.

The template registration screen 1800 includes a document selection box 1810, a SELECT button 1820, an attribute setting box 1830, an ADD button 1840, a position setting box 1850, and a REGISTER button 1860.

The document selection box 1810 is a box for selecting a document used in a case of registering a template. A list of documents having the same document format as that of the target document is displayed in the document selection box 1810. The SELECT button 1820 is a button for selecting a document to be used.

The attribute setting box 1830 is a box for setting types of attributes to be contained in the template. The ADD button 1840 is a button for adding a row to the attribute setting box 1830.

The position setting box 1850 is a box for setting positions, on the page space, of attributes corresponding to the types of the attributes set in the attribute setting box 1830.

The document image data 801 regarding the document selected in the document selection box 1810 is displayed in the position setting box 1850. Regions indicating the positions of the attributes on the page space are highlighted. In FIG. 18, shaded regions are the regions indicating the positions of the attributes on the page space. Furthermore, in a case in which a cluster corresponding to the document format is present and the range of the position of the attribute is set in the coordinates change 504 in the entry corresponding to the cluster, the range on an image is highlighted. In FIG. 18, each of horizontal line regions indicates the range of the position of each attribute.

The REGISTER button 1860 is a button for registering the template input to the screen in the template information 222.

While the computing machine 100 automatically classifies the cluster type in the classification process in the first embodiment, the operator may perform classification. In this case, the computing machine 100 displays a new template and the read result of the target document in the position setting box 1850. Furthermore, the template registration screen 1800 includes an operation button for selecting the cluster type.

In a case of operator's selecting the document displayed in the document selection box 1810 and operating the SELECT button 1820, the document image data 801 regarding the selected document is displayed in the position setting box 1850. In addition, operator's selecting a rectangular region in such a manner as to surround each character string displayed in the position setting box 1850 enables the operator to set coordinates stored in the position information 403.

In a case of operator's operating the REGISTER button 1860, the template setting module 212 adds an entry to the template information 222 and sets information about the new template in the added entry.

Specifically, the template setting module 212 sets identification information to the document number 301 in the added entry and sets a document type to the document format 302. In addition, the template setting module 212 generates rows as many as the types of the attributes set in the attribute setting box 1830 in the added entry and sets a value in the attribute setting box 1830 to the attribute name 303 in each row. Furthermore, the template setting module 212 sets a value to the position information 304 in each row on the basis of an operation on the position setting box 1850.

Displaying the screen as depicted in FIG. 18 makes it possible to support generation of a template to be registered. This can reduce the number of processes required for generating the template.

FIG. 19 depicts an example of a template comparison screen 1900 displayed by the computing machine 100 according to the first embodiment.

The template comparison screen 1900 is a screen for operator's comparing a new template with an existing template. The template comparison screen 1900 can be displayed at arbitrary timing in response to an operator's request.

The template comparison screen 1900 includes a new template display box 1910, an existing template display box 1920, a CHANGE button 1930, a REGISTER button 1940, and an ABANDON button 1950.

The new template display box 1910 is a box for displaying the new template. The new template is displayed in the new template display box 1910 in such a manner as to be superimposed on the document image data 801 regarding the generation source document.

The existing template display box 1920 is a box for displaying the existing template. The existing template is displayed in the existing template display box 1920 in a similar manner to that of the new template display box 1910.

The CHANGE button 1930 is a button for changing the existing template to be compared. In a case of operator's operating the CHANGE button 1930, the template displayed in the existing template display box 1920 is changed.

The REGISTER button 1940 is the same button as the REGISTER button 1860. The ABANDON button 1950 is an operation button for abandoning the new template. In a case of operator's operating the ABANDON button 1950, a request to stop generating the new template is input to the computing machine 100. In this case, the computing machine 100 ends the template management process without executing the processes in and after Step S1205.

Figure 20:
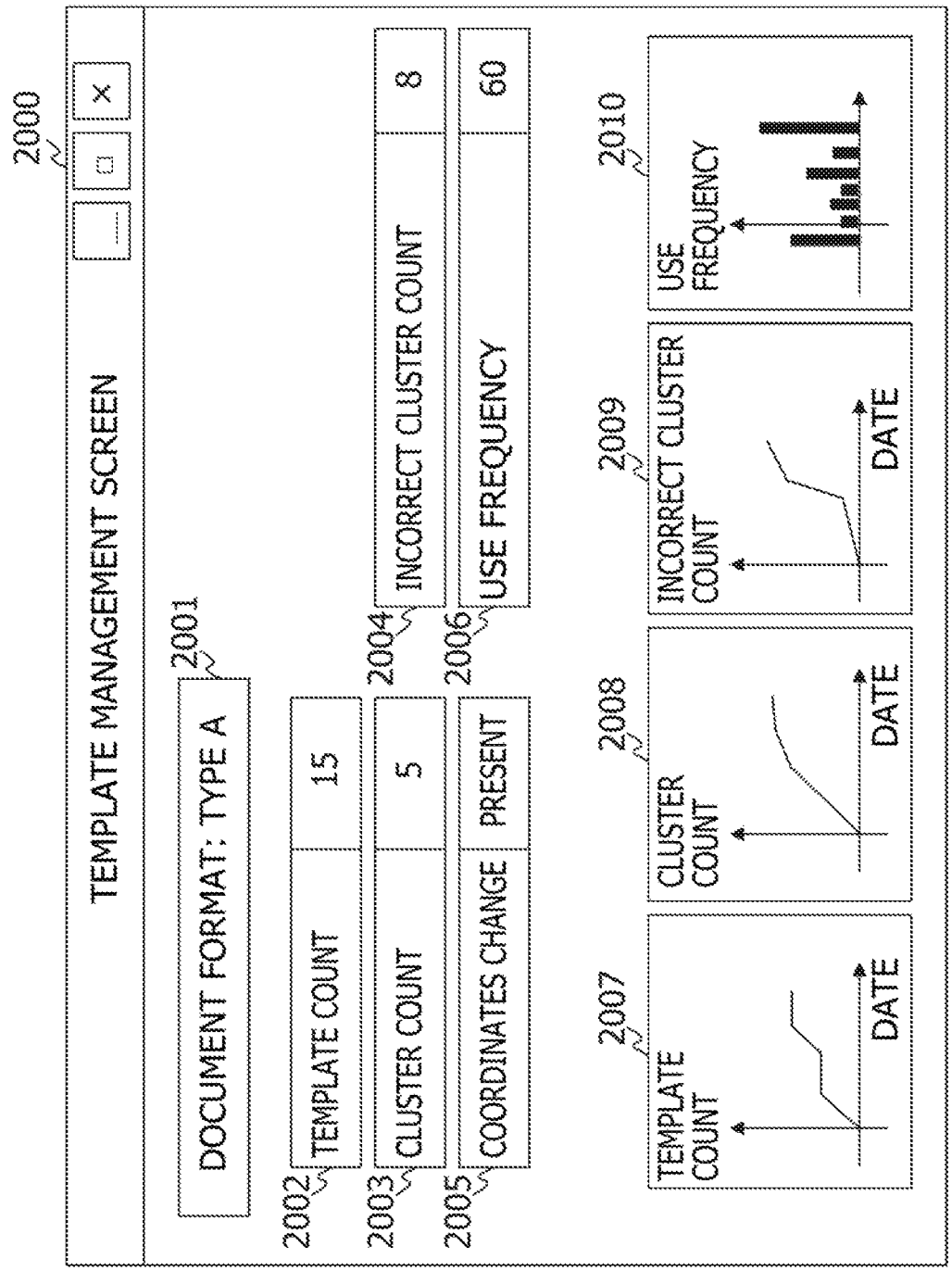
FIG. 20 depicts an example of a template management screen displayed by the computing machine according to the first embodiment.

FIG. 20 depicts an example of a template management screen 2000 displayed by the computing machine 100 according to the first embodiment.

The template management screen 2000 is a screen for displaying the number of generated templates and the number of clusters. The template management screen 2000 is displayed, for example, during or after execution of the template management process or in a case in which an operator's display request is received.

The template management screen 2000 includes a document format selection box 2001, a template count display box 2002, a correct cluster count display box 2003, an incorrect cluster count display box 2004, a coordinates change display box 2005, a use frequency display box 2006, and graph display boxes 2007, 2008, 2009, and 2010. It is noted that all the display boxes described above are not necessarily displayed on the template management screen 2000 and the template management screen 2000 may have a configuration including the operator's selected display boxes.

The document format selection box 2001 is a box for selecting a document format. The information about templates and clusters associated with the document format input to the document format selection box 2001 is displayed on the template management screen 2000.

The template count display box 2002 is a box for displaying a total number of current templates. The computing machine 100 calculates the number of entries in each of which the value of the document format 405 matches a value in the document format selection box 2001 and displays a calculated value in the template count display box 2002.

The correct cluster count display box 2003 is a box for displaying a total number of current correct clusters. The incorrect cluster count display box 2004 is a box for displaying a total number of current incorrect clusters. The computing machine 100 searches the entries in each of which the value of the document format 302 matches the value in the document format selection box 2001 and acquires a value of the cluster number 305 in each entry. The computing machine 100 refers to the cluster management information 223 on the basis of the identification number of each cluster and calculates the number of correct clusters and the number of incorrect clusters. The computing machine 100 displays calculated values in the correct cluster count display box 2003 and the incorrect cluster count display box 2004.

The coordinates change display box 2005 is a box for displaying a value that indicates whether a document having an attribute at a variable position on the page space depending on the document is contained in each cluster. The computing machine 100 refers to the cluster management information 223 and searches entries of the clusters corresponding to the document format designated in the document format selection box 2001. Furthermore, the computing machine 100 determines whether an entry in which attribute information is set to the coordinates change 504 is present among the searched entries. The computing machine 100 displays "present" in the coordinates change display box 2005 in a case in which an entry in which attribute information is set to the coordinates change 504 is present, and displays "not present" in the coordinates change display box 2005 in a case in which an entry in which attribute information is set to the coordinates change 504 is not present.

The use frequency display box 2006 is a box for displaying a total value of use frequencies of the templates corresponding to the document format designated in the document format selection box 2001. The computing machine 100 searches entries each containing the document format matching the value in the document format selection box 2001 and displays the total value of the use frequencies 407 in the searched entries in the use frequency display box 2006.

The graph display box 2007 is a box for displaying a graph that indicates a temporal transition of the number of templates. The graph display box 2008 is a box for displaying a graph that indicates a temporal transition of the number of correct clusters. The graph display box 2009 is a box for displaying a graph that indicates a temporal transition of the number of incorrect clusters. The graph display box 2010 is a box for displaying a graph that indicates a temporal transition of the use frequency.

According to the first embodiment, the computing machine 100 can classify each document on the basis of the position of the document in the feature space and configure a cluster on the basis of the classification result. Furthermore, the computing machine 100 can automatically set the threshold of the cluster on the basis of the template information 222.

The computing machine 100 can thereby appropriately determine whether to generate a template. Therefore, even in a case in which an unknown document is input, the computing machine 100 can improve efficiency of template generation work.

The present invention is not limited to the embodiment described above and encompasses various modifications. For example, the above-mentioned embodiment has been described in detail for describing the present invention so that the present invention is easy to understand, and the present invention is not always limited to an invention having all the configurations described so far. Moreover, for a part of the configuration of each embodiment, additions, omissions, and substitutions of the other configurations can be made.

Furthermore, configurations, functions, processing sections, processing means, and the like described above may be realized by hardware by, for example, designing a part or all thereof with integrated circuits. Moreover, the present invention can be realized by a program code of software that realizes the functions in the embodiment. In this case, a storage medium that records the program code is provided to a computer and a processor included in the computer reads the program code stored in the storage medium. In this case, the program code itself read from the storage medium realizes the functions in the embodiment described above; thus, the program code itself and the storage medium storing the program code configure the present invention. As the storage medium for supplying such a program code, a flexible disk, a CD-ROM, a DVD-ROM, a hard disk, an SSD (Solid State Drive), an optical disk, a magneto-optical disk, a CD-R, a magnetic tape, a nonvolatile memory card, or a ROM, for example is used.

Moreover, the program code that realizes the functions described in the present embodiment can be implemented by, for example, a program or a script language in a wide range such as an assembler, C/C++, perl, Shell, PHP, and Java (registered trademark).

Furthermore, the program code of the software that realizes the functions in the embodiment may be distributed via a network, the program code may be thereby stored in storage means such as a hard disk or a memory of the computer or a storage medium such as a CD-RW or a CD-R, and the processor included in the computer may read the program code stored in the storage means or the storage medium and execute the program code.

In the embodiment described above, control lines or information lines considered to be necessary for the description are illustrated and all the control lines or the information lines are not always illustrated in terms of a product. All the configurations may be mutually connected.

What is claimed is:

1. A computing machine managing a plurality of templates, each defining a position, on a document, of at least one attribute contained in the document, the computing machine comprising:
   at least one processor;
   at least one storage storing thereon a plurality of programs that when executed by the at least one processor cause the computing machine to perform the steps of:
   obtaining information of a target document that has a document format, which has been subjected to a recognition process, and wherein the recognition process acquires attributes on the target document;
   calculating an optical character recognition (OCR) score and a position score of a specific attribute from the acquired attributes by comparing the information of the target document with a previously stored template, the OCR score corresponding to a degree of similarity between an acquired character string of the specific attribute and a character string of a stored attribute on a stored template and the position score corresponding to a deviation between a position of the specific attribute and a position of the stored attribute;
   determining whether a cluster of a plurality of clusters, that are predefined and each cluster corresponding to at least one other document having the document format, to which the target document can belong is present on the basis of the position score of the specific attribute of the target document by perform ing the steps of:
   calculating a distance between the position score of the target document and a center of gravity of each cluster of the plurality of clusters; and
   determining whether there is at least one cluster to which the target document can belong is present on the basis of a result of comparison between the distance and a threshold;
   upon determining that there is no cluster present to which the target document can belong on the basis of the result of the comparison, output an instruction to generate a new template and display a template generation screen having a selectable list of documents and a list of attributes that comprise the acquired attributes and one or more new attributes that are added upon operator input and wherein positions of the attributes listed are displayed according to document image data of a selected document for the selectable list of documents provided on the template generation screen and registering the new template based on the target document upon receiving an instruction to register the new template;
   generating a new cluster upon determining that there is no cluster present to which the target document can belong; and
   managing the document format of the target document, the new template and the new cluster in such a manner that the document format of the target document, the new template of the target document, and the new cluster correspond to one another.

2. The computing machine according to claim 1, wherein the at least one processor causes the computing machine to further perform the steps of:
   managing a first threshold for determining whether the target document can belong to a first cluster of the at least one first cluster and a second threshold for determining whether the target document can belong to a second cluster of the at least cluster; and
   updating the first threshold or the second threshold in a case of determining that the target document can belong to first cluster or the second cluster, respectively.

3. The computing machine according to claim 2, wherein the at least one processor causes the computing machine to further perform the steps of:
   analyzing a position, on another target document, of an attribute of the another target document contained in each of the first and second clusters;
   identifying a variable attribute that is an attribute at a variable position on the another target document based on the document format of the another document contained in each of the first and second clusters; and
   managing each of the first and second clusters and the variable attribute in such a manner that each of the first and second clusters and the variable attribute correspond to each other.

4. The computing machine according to claim 3, wherein the at least one processor causes the computing machine to further perform the steps of:
   generating display information for displaying information about the new template and the new cluster made to correspond to the target document; and
   outputting the display information.

5. A template management method executed by a computing machine managing a plurality of templates, each defining a position, on a document, of at least one attribute contained in the document, the computing machine comprising at least one processor and at least one storage storing thereon a plurality of programs, the method comprising the steps of:
   obtaining information of a target document that has a document format, which has been subjected to a recognition process, and wherein the recognition process acquires attributes on the target document;
   calculating an optical character recognition (OCR) score and a position score of a specific attribute from the acquired attributes by comparing the information of the target document with a previously stored template, the OCR score corresponding to a degree of similarity between an acquired character string of the specific attribute and a character string of a stored attribute on a stored template and the position score corresponding to a deviation between a position of the specific attribute and a position of the stored attribute;
   determining whether a cluster of a plurality of clusters, that are predefined and each cluster corresponding to at least one other document having the document format, to which the target document can belong is present on the basis of the position score of the specific attribute of the target document by performing the steps of:
  calculating a distance between the position score of the target document and a center of gravity of each cluster of the plurality of the clusters; and
  determining whether there is at least one cluster to which the target document can belong is present on the basis of a result of comparison between the distance and a threshold;
upon determining that there is no cluster present to which the target document can belong on the basis of the result of the comparison, output an instruction to generate a new template and display a template generation screen having a selectable list of documents and a list of attributes that comprise the acquired attributes and one or more new attributes that are added upon operator input and wherein positions of the attributes listed are displayed according to document image data of a selected document for the selectable list of documents provided on the template generation screen and registering the new template based on the target document upon receiving an instruction to register the new template;
generating a new cluster upon determining that there is no cluster present to which the target document can belong; and
managing the document format of the target document, the new template and the new cluster in such a manner that the document format of the target document, the new template of the target document, and the new cluster correspond to one another.

6. The template management method according to claim 5, further comprising the steps of:
  managing a first threshold for determining whether the target document can belong to the first cluster of the at least one cluster and a second threshold for determining whether the target document can belong to the second cluster of the at least one cluster; and
  updating the first threshold or the second threshold in a case of determining that the target document can belong to the first cluster or the second cluster, respectively.

7. The template management method according to claim 6, further comprising the steps of:
  analyzing a position, on another target document, of an attribute of the another target document contained in each of the first and second clusters;
  identifying a variable attribute that is an attribute at a variable position on the another document based on a document format of the another target document contained in each of the first and second clusters; and
  managing each of the first and second clusters and the variable attribute in such a manner that each of the first and second clusters and the variable attribute correspond to each other.

8. The template management method according to claim 7, further comprising the steps of:
  generating display information for displaying information about the new template and the new cluster made to correspond to the target document; and
  outputting the display information.

\* \* \* \* \*